United States Patent
McElvain et al.

(10) Patent No.: US 7,251,800 B2
(45) Date of Patent: Jul. 31, 2007

(54) METHOD AND APPARATUS FOR AUTOMATED CIRCUIT DESIGN

(75) Inventors: Kenneth S. McElvain, Los Altos, CA (US); Andrew Crews, Sunnyvale, CA (US); Champaka Ramachandran, Cupertino, CA (US)

(73) Assignee: Synplicity, Inc., Sunnyvale, CA (US)

( * ) Notice: Subject to any disclaimer, the term of this patent is extended or adjusted under 35 U.S.C. 154(b) by 416 days.

(21) Appl. No.: 10/856,280

(22) Filed: May 27, 2004

(65) Prior Publication Data

US 2004/0243964 A1 Dec. 2, 2004

Related U.S. Application Data

(60) Provisional application No. 60/475,059, filed on May 30, 2003.

(51) Int. Cl.
  *G06F 17/50* (2006.01)
(52) U.S. Cl. .................. 716/12; 716/8; 716/9; 716/10; 716/11; 716/14
(58) Field of Classification Search .................. 716/5, 716/6, 8–14
  See application file for complete search history.

(56) References Cited

U.S. PATENT DOCUMENTS

| | | | |
|---|---|---|---|
| 5,666,290 A | 9/1997 | Li et al. | |
| 5,696,771 A * | 12/1997 | Beausang et al. | 714/726 |
| 5,787,008 A | 7/1998 | Pullela et al. | |
| 5,978,572 A | 11/1999 | Toyonaga et al. | |
| 6,009,248 A * | 12/1999 | Sato et al. | 716/2 |
| 6,543,036 B1 | 4/2003 | Iyer et al. | |
| 6,553,338 B1 | 4/2003 | Buch et al. | |
| 2003/0051217 A1 | 3/2003 | Cheng | |
| 2004/0016842 A1 | 1/2004 | Couchey | |
| 2004/0017207 A1 | 1/2004 | Herrmann et al. | |

OTHER PUBLICATIONS

Changfan, Chieh et al. "Timing Optimization on Routed Designs with Incremental Placement and Routing Characterization," IEEE Transactions on Computer-Aided Design of Integrated Circuits & Systems, vol. 19, No. 2 (Feb. 2000), pp. 188-196.

(Continued)

*Primary Examiner*—Sun James Lin
(74) *Attorney, Agent, or Firm*—Blakely, Sokoloff, Taylor & Zafman LLP

(57) ABSTRACT

Methods and apparatuses to automatically modify a circuit design according to the possible deviation in the subsequent implementation of the circuit. In one aspect, a method to design a circuit includes: determining whether a design constraint is likely to be violated during a subsequent routing implementation of a design of the circuit; and, modifying the design of the circuit to reduce likelihood of the design constraint being violated during a subsequent implementation. For example, a route for a net with a number of fanout larger than two and on a timing critical or near-critical path may be considered sensitive to route topology such that an alternative routing path may lead to a violation in timing constraint; to reduce the possibility of a timing problem in a subsequent routing solution, a transformation can be selectively applied to the circuit design to an extent not worsening a cost function.

76 Claims, 17 Drawing Sheets

OTHER PUBLICATIONS

Kastner, Ryan et al. "Predictable Routing," IEEE/ACM International Conference on Computer-Aided Design (Nov. 5, 2000), pp. 110-113.

Ren, Pan and Kung. "Sensitivity Guided Net Weighting for Placement Driven Synthesis," ISPD'04 (Apr. 18-21, 2004), pp. 10-17.

Coudert O: "Timing and design closure in physical design flows", Proceedings of the International Symposium on Quality Electronic Design, Mar. 18, 2002 (6 pages).

Phillip Christie, et al., "Prelayout Interconnect Yield Prediction", IEEE Transactions on Very Large Scale Integration (VLSI) Systems, vol. 11, No. 1, Feb. 2003, 6pp.

* cited by examiner

METHOD AND APPARATUS FOR AUTOMATED CIRCUIT DESIGN

The present application claims the benefit of the filing date of provisional application Ser. No. 60/475,059, filed May 30, 2003 and entitled "Method and Apparatus for Automated Circuit Design", by the inventors Champaka Ramachandran, Andrew Crews and Kenneth S. McElvain, which is hereby incorporated herein by reference.

FIELD OF THE INVENTION

The invention relates to automated circuit design, and more particularly to the automated optimization of the design of a circuit before performing a detailed design layout.

BACKGROUND

For the design of digital circuits (e.g., on the scale of Very Large Scale Integration (VLSI) technology), designers often employ computer-aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning". A typical floor planning operation divides the circuit area of an integrated circuit into regions, sometimes called "blocks," and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and routing typically runs faster because as it has been reduced from one very large problem into a series of simpler problems.

After placement of components on the chip and routing of wires between components, timing analysis (e.g., timing simulation, or static timing analysis) can be performed to accurately determine the signal delays between logic elements. Back annotation can be performed to update a more-abstract design with information from later design stages. For example, back annotation reads wire delay information and placement information from the placement and route database to annotate the logic synthesis design. Back annotated delay information can be used to identify critical paths where the timing requirements are not satisfied; and logic synthesis may be improved to meet the timing requirements.

A typical software program for logic synthesis uses a delay estimator function based on the fanout of a net. Since all logic elements corresponding to a net with a certain fanout are assumed to have the same wire delay, the estimated delay information is not very accurate. In reality the wire delay depends on the length of the wire routed from one logic element to the next logic element. There is a higher correlation between placement distance and wire delay than between fanout and wire delay. Due to the error in the delay estimator in logic synthesis, a solution appears to be valid during logic synthesis may be found invalid after the placement and routing operation.

After the design layout (e.g., the placement and routing), only limited optimizations like resizing or buffering (known as in place optimizations) are typically performed. However, in place optimizations can provide only limited improvements. When the in place optimization cannot adjust the solution to meet the timing constraint, adjustment to the logic synthesis may be performed, leading to the expensive iteration between logic synthesis and placement and routing.

Synthesis and optimizations of logic circuits for reducing the delay of critical paths is an important step in designing and implementing a logic circuit. It is desirable to have accurate wire delay information to obtain optimization results of good qualities, since inaccurate delay estimation in the synthesis stage may lead to invalid design layout. If logic synthesis has to be improved to meet the timing requirement (e.g., slack requirement), expensive iterations between synthesis and design layout have to be performed. Note that slack is the difference between the desired delay and the actual (estimated or computed) delay. When the desired delay is larger than the actual delay, the slack is positive; otherwise, the slack is negative. Typically, it is necessary to make the slack positive (or close to zero) to meet the timing requirement (e.g., through reducing the wire delay to increase the slack). For example, during synthesis, a total negative slack algorithm (e.g., used in a circuit design compiler, Synplify, available from Synplicity, Inc., California) considers all instances whose slack is negative as candidates for improvement, since any one of the candidates with negative slack could become critical after physical design. It is typical to make the slack positive to ensure that the timing requirements are met.

SUMMARY OF THE DESCRIPTION

Methods and apparatuses to automatically modify a circuit design (e.g., a synthesis solution) according to the sensitivity in design parameters with respect to the possible deviation in the subsequent implementation (e.g., placement and routing) of the circuit are described here. For example, a net with a number of fanout larger than two and on a timing critical or near-critical path may be considered sensitive to route topology such that an alternative routing path may lead to a violation in timing constraint; to reduce the possibility of a timing problem in a subsequent routing solution, a transformation can be selectively applied to the circuit design to an extent not worsening a cost function. Some embodiments of the present inventions are summarized in this section.

In one aspect of the present invention, a method to design a circuit, includes: determining whether or not a design constraint is likely to be violated during a subsequent routing implementation of a design of the circuit; and, modifying the design of the circuit to reduce likelihood of the design constraint being violated during a subsequent routing implementation of the design. In one example of an embodiment, the likelihood of the design constraint being violated in a subsequent routing implementation of the design is due to uncertainty in estimating route topology. In one example of an embodiment, whether or not the design constraint is likely to be violated during a subsequent routing implementation of the design is determined based on: 1) a bounding box that encloses load elements of a drive element; and, 2) a number of fanout of a net on a timing critical or near-critical path, where the net connects the drive element to the load elements. In one example of an embodiment, the modification to the design includes: replicating a first drive element to insert a second drive element; and, reconnecting a portion of load elements of the first drive element as load elements of the second drive element. In another example of an embodiment, the modification to the design includes: inserting a buffer element as a load element of a first drive element; and, reconnecting a portion of load elements of the first drive element as load elements of the buffer element. In a further example of an embodiment, the modification to the design includes: rearranging placement of load elements of a drive element to reduce a ratio of a short side over a long side of a bounding box of the drive element and the load elements. In one example of an embodiment, the modification to the design includes: transforming a portion of load elements of a first element as load elements of a second element. In one example, the design constraint is a timing constraint (e.g., worst negative slack of the circuit, a slack for an instance of a logic element in the design of the circuit, a delay on a path in the design of the circuit, a total negative slack of the circuit, or others). In one example of an embodiment, a number of net candidates each of which may cause a violation in the design constraint when alternative route topology is used are determined; and the design is selectively modified for a subset of the number of net candidates. In one example of an embodiment, the subset is selected from the number of net candidates according to flow which represents a number of paths passing through each net candidate. In another example of an embodiment, a min-cut is performed on a graph with the number of net candidates to determine the subset for modification.

In one aspect of the present invention, a machine implemented method to design a circuit, includes: estimating a first distance between a drive element and a load element of the drive element according to a design of the circuit; verifying whether or not a timing constraint is satisfied using the first distance; estimating a second distance between the drive element and the load element according to the design of the circuit, the second distance being longer than the first distance; and determining whether or not a timing constraint is satisfied using the second distance. In one example of an embodiment, the first distance is according to a first route topology; and the second distance is according to a second route topology. The different route topologies can be the result of different routing goals, such as total wire length minimization, satisfying timing constraints, or combinations of the two. In one example of an embodiment, determining whether or not a transformation can be performed on the design of the circuit to reduce the second distance without worsening a design cost function is determined, in response to a determination that a timing constraint is not satisfied when the second distance is used. For example, the transformation may be replicating the drive element, sizing up the drive element, inserting a buffer element between the drive element and the load element, and/or adjusting placement of at least one element of: the drive element and load elements of the drive element. In one example of the embodiment, the second distance is estimated only when a net connecting the drive element and the load element is selected for reduction of route topology sensitivity; and the net is selected only when the net is on a timing critical or near-critical path and a number of fanout of the net is larger than two. In one example of an embodiment, the net is further selected according to an aspect ratio of a bounding box enclosing load elements of the drive element.

For convenience, the aspect ratio of a bounding box is considered the ratio of the short side over the long side so that the aspect ratio is never larger than 1.

In one aspect of the present invention, a machine implemented method to design a circuit, includes: determining a shape of a region of: a drive element and a plurality of load elements of the drive element; and, estimating a distance between the drive element and a first one of the plurality of load elements based at least on the shape of the region. In one example of an embodiment, the shape of the region is used to estimate how much various routing algorithms with different route goals (such as total wire length minimization, satisfying timing constraints, and some combination of both) may differ. In one example of an embodiment, determining the shape of the region includes: determining a bounding box enclosing the plurality of load elements; where the distance is estimated based at least on the bounding box. In one example of an embodiment, the distance is estimated as a function of a minimum routing distance (e.g., the Manhattan distance) between the drive element and the first one of the plurality of load elements and a length of a short side of the bounding box. In one example of an embodiment, the distance is further estimated according to a slack of the drive element. In one example, the bounding box is rectangular.

In one aspect of the present invention, a method to design a circuit includes: determining likelihood of a design constraint (e.g., a timing constraint, maximum capacitance, maximum transition, maximum crosstalk) being violated in an implementation of a first circuit design (e.g., a technology specific netlist with or without a placement solution); and, modifying the first circuit design to reduce the likelihood of the design constraint being violated. In one example, the implementation of the first circuit design includes a routing solution for implementing the first circuit design; and, the first circuit is modified through sizing an instance of a logic element, buffering a signal, load shielding for a signal, sizing a weakest driver of a logic element or other operations. In one example, the design constraint includes a timing constraint (e.g., worst negative slack of the circuit, a slack for an instance of a logic element in the first circuit design, a delay on a path in the first circuit design, a total negative slack of the circuit, or others). A total negative slack of a circuit is the sum of all negative slack at all endpoints of a circuit. An endpoint of a circuit is a point in the circuit where a path ends. In one example, modifying the first circuit design includes selecting an instance of a logic element for modification according to sensitivity of the design constraint to a parameter of the logic element due to uncertainty in an implementation of the first circuit design. In another example, modifying the first circuit design includes selecting a path for modification according to sensitivity of the design constraint to at least one parameter of logic elements on the path due to uncertainty in an implementation of the first circuit design. In one example, the likelihood of a design constraint being violated is determined from a possible change in estimated parameters (e.g., a net length, a net capacitance) for a net connecting to an instance of a logic element in the first circuit design. In one example, after a number of candidates are determined from the instances of logic elements of the first circuit design based on sensitivity to uncertainty in an implementation of the first circuit design, a subset of the number of candidates is selectively modified (e.g., selecting one from the number of candidates according to flow that represents a number of paths passing through the candidate, and sizing up the selected one; or, performing a min-cut on a graph of the candidates, sizing up the ones on the cut). In one example, sizing up is performed only to an extent without degrading an overall design constraint (e.g., worst negative slack).

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary references to the same embodiment; and, such references means at least one.

At least one embodiment of the present invention seeks to optimize a circuit design (e.g., a synthesis solution of a technology specific design) so that the likelihood of design constraints being violated in an implementation of the circuit design is reduced (e.g., after placement and routing). In one embodiment, a minimum set of instances is selected for transformation to decrease the probability that they will be involved in the violation of the timing objective.

Many of the methods of the present invention may be performed with a digital processing system, such as a conventional, general-purpose computer system. Special purpose computers, which are designed or programmed to perform only one function, may also be used.

Figure 1:
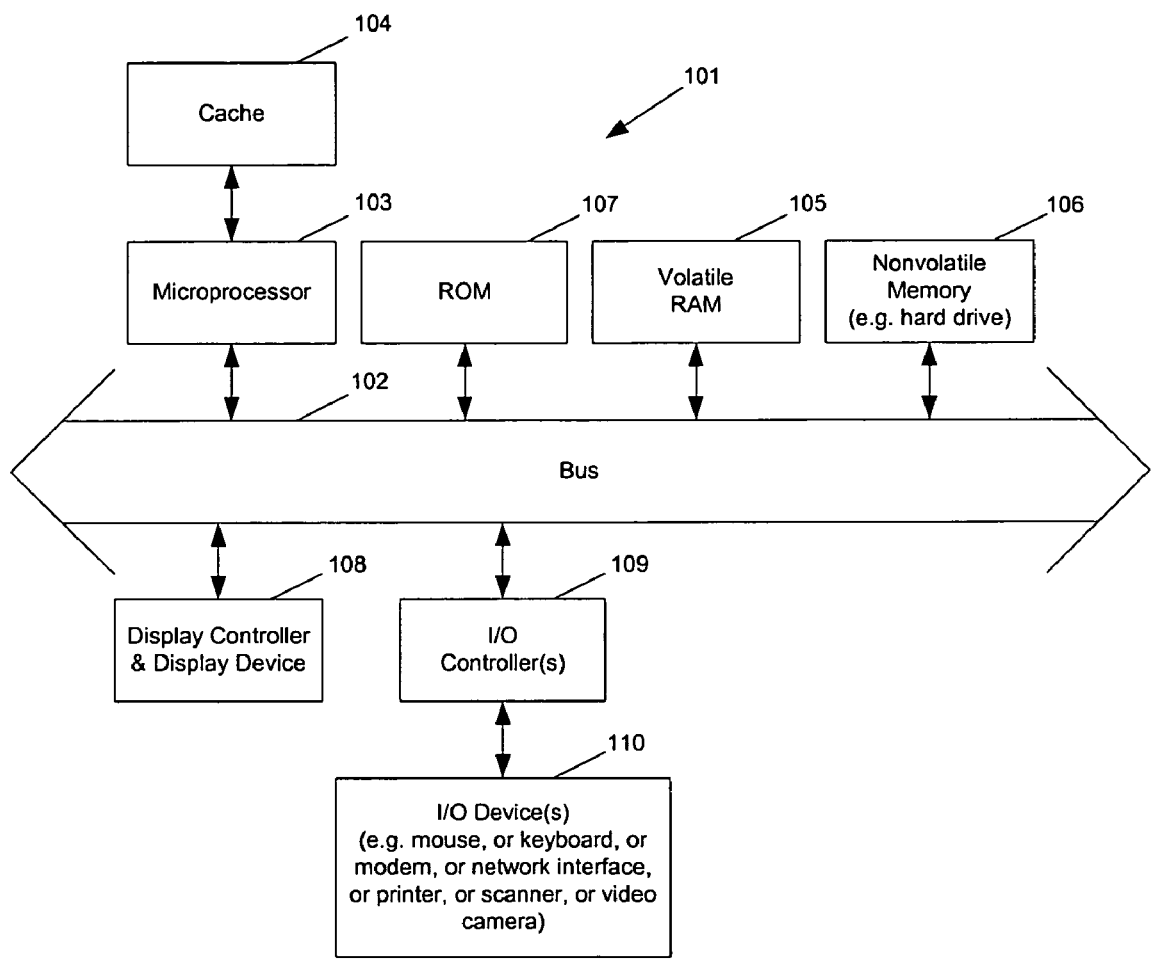
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Sun workstation, or a personal computer (PC) running a Windows operating system, or an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103 is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In a typical circuit design process, a logic synthesis tool creates a logic element network that performs a given set of functions. The logic synthesis tool may transform and restructure the logic to optimize delays, areas and other design goals. The gate-level logic elements are mapped to vendor specific primitives to generate a technology specific netlist. The mapped technology specific netlist are then assigned to various blocks on the chip. A placement and routing tool then places the vendor specific primitives of the mapped netlist on the chip and routes the wires between the primitives. After the placement and routing, in place optimizations are typically performed to further optimize timing. In place optimizations make constrained changes to the logic elements without significantly changing the placement of the logic elements. After the placement and routing information is available, a detailed timing analysis can be performed to accurately determine if the timing constraints are all satisfied. If it is determined that the timing requirements are not all satisfied, the design produced by logic synthesis is changed to meet the timing requirements.

Thus, the accuracy of delay prediction of a synthesis tool for circuit design appears important for the generation of a good quality of results. Typically, a backend software program uses the design result of the synthesis tool for the detailed implementation of the circuit. For example, a placement and routing tool uses the design result of the synthesis tool for design layout. The delay on the critical path predicted by the synthesis tool, based on the synthesis estimated delay, should be in close fidelity with the timing objectives that are calculated based on the detailed data (e.g., parasitics data, detailed routing information) extracted from later stages of design (e.g., routing, layout and others). If the synthesis tool accurately predicts this backend delay prior to the handoff, the need to perform expensive iterations involving the synthesis tool and the backend software program can be avoided.

However, a synthesis tool may not always accurately predict this backend delay. Most timing objectives involve cell delays and net delays caused by the long wires. The long wire delays are typically handled in synthesis by buffering the long wires and hence effectively fracturing them into smaller wires. Thus, accurately predicting the delay of the cells can lead towards achieving a good prediction of the timing objective. The delay of a cell is typically a function of a capacitive load of a cell. The major components of a capacitive load include the capacitance of the net connected to the driver of the cell and the capacitive load of the load pins. The capacitance of the load pins can be deduced based on the logical connectivity of the design. However, the capacitance of the net can only be accurately obtained when the design layout is complete. Thus, the synthesis tool gets the onus of predicting the behavior of the backend software that eventually creates the design layout.

Rather than predicting the exact delay, the probability distribution of delay can be determined so that the probability of a portion of the circuit (e.g., a gate, or a path) involved in the violation of a timing objective can be evaluated. At least one embodiment of the present invention seeks to perform transformation on the portions of the circuit that have a higher probability in violating timing constraints to reduce the need for iterations involving the backend software program.

For example, sensitivity in the timing parameters with respect to a timing constraint due to possible deviations in the subsequent implementation (e.g., deviating from what is estimated by the embedded timing engine in the synthesis tool) is an indicator of the probability in violation in the subsequent implementation. A synthesis tool according to embodiments of the present invention performs transformations to ensure that the change in the timing objective is insignificant, in relation to the timing constraint, after performing the layout of the design. According to embodiments of the present invention, it is desirable that the possible deviation from delay estimation is small along critical paths and along near critical paths. Thus, the synthesis tool according to embodiments of the present invention identifies the possible post-layout critical and near critical portions of the circuit and performs transformations for these portions to reduce variation in the delay on critical paths and near critical paths, thus reducing the likelihood of getting a timing constraint violation when the design layout is implemented.

The timing objective and its uncertainty in estimation for the synthesis tool are primarily dependent on the net fanout, the drive strength of the instances, and other estimated factors such as wire load, and in physical synthesis, the route length, congestion effects and technology information such as resistance and capacitance per unit length of a wire. Congestion can affect both the coupling capacitance and the wire length (e.g., causing route detours).

For example, if there is a cell with a low drive strength driving a long net, even a small variation in the length of the net could have a large impact on the delay of the driving cell. Although one may completely eliminate all low drive strength cells and use only high drive strength cells, such an approach increases the area and loading penalty, which in turn adversely affects all the timing objectives. Thus, at least one embodiment of the present invention selectively chooses the cells for which the drive strength needs to be improved.

At least one embodiment of the present invention selectively performs design transformation on a subset of cells in the netlist of a circuit design. Various algorithms for identifying a reduced set (e.g., a minimal set) of instances for transformation are described below.

At least one embodiment of the present invention estimates the probability of timing constraint violation based on estimated physical data. For example, the probability of violation based on the sensitivity values is used to prioritize the improvement for instances so that ones which have a higher probability of violating after physical design are improved before those with a lower probability of violating. Thus, the candidate list may be minimized based on the probability of violation. Typically, a small set of the candidate list can be selected for improvement so that the area utilization after the improvement is smaller than improving all the instances with negative slack.

In one embodiment of the present invention, portions of the circuit are selected for design transformation, to reduce the probability of violating timing constraint in a later design stage of the design, based on the probability that the portions (e.g., an instance of a logic element, or a path in the circuit) may be involved in the violation of a timing objective. For example, the selection can be based on the probability of each gate involved in the violation of a timing objective (e.g., sensitivity to uncertainty due to the gate); or, the selection can be based on the probability of each path involved in the violation of a timing objective.

In one embodiment of the present invention, instances are examined one at a time to determine whether it will be involved in the violation of a timing objective. For example, a subset of instances can be selected for improving the drive strength; and, the size of the subset of instances is minimized through including only those whose sizing up will not cause degradation in the worst negative slack of the design and whose sizing up will also maintain the area utilization of the design within a predefined upper bound.

In one embodiment of the present invention, a subset of instances is selected according to the worst negative slack in the design. For example, portions of the circuits are selected for design transformation for the instances whose slack is worse than a threshold (e.g., between the threshold and the worst negative slack). The sensitivity of those instances to the change in the load can be determined, which is described in detail further below. If an increase in the load causes the slack of the instance to exceed that of the worst negative slack, the instance is selected on the list of candidates for size improvement.

In another embodiment of the present invention, a subset of instances whose slack is negative is selected. The sensitivity of all the instances in this subset is computed; and, the instances are prioritized for a design transformation based on a decreasing sensitivity value. In this scenario it is ensured that the total negative slack of the design is not degraded.

The change in the load can be estimated based on a perturbation of the wire load model when placement information for the instances is not available. In the case of physical synthesis, this change in the load on the instance can be determined based on more accurate physical information.

For example, when detailed placement is performed during physical synthesis, the legal locations of all instances in the design are available. A quick global route estimation can be performed to determine the most likely route that a net would assume. From these estimated routes, a predicted congestion map of the routes is determined.

Congestion can cause variation in the coupling capacitance of the wire. A net that gets routed through a region that is heavily congested is most likely to get detoured around the congested area, if the route resources are less than the demand of nets that need to get routed in that area. These types of nets are most likely to have an increase in net length.

Layer assignments of net after detailed routing can also cause unpredictable changes in resistance and capacitance of wires. Reducing the sensitivity of the instances in the congested area can reduced the effect of the unpredictable changes that may cause violations in timing requirements after the detailed routing.

In addition to the excess congestion of the area through which the net is routed, if there exists excess congestion in the neighboring areas, the amount of detour is likely to increase. The amount of detour is typically dependent on the shape and size of the area of congestion. The amount of detour may also be dependent on other parameters (e.g., timing parameters). Hence the possible length changes for these types of net can be further estimated accordingly.

In one embodiment, the increase in wire length can be estimated using a function that is dependent on the route congestion of the segments of the nets as well as the neighboring area route congestion. Typical global route estimates provide a lower bound on the actual length of the net. Thus, a factor based on experimental (or statistical) results that denotes the amount of (historical) perturbation of net length in excess of the lower bound length is added in one embodiment.

If the perturbation in the net length causes the slack of the instance to exceed the worst negative slack, the driving element of the net needs to be sized up until the effect of this perturbation does not contribute to a significant change in slack (e.g., causing the slack to be worse than a threshold value).

In one embodiment of the present invention, a possible change in net capacitance (ncc) is estimated according to the increase of net length because of a non-optimal route (el, the estimated length of the route), the fanout of the net (f), a congestion factor for a net segment (cg), a congestion factor for the neighborhood of the net segment (ncg), a congestion threshold (ct), and the height of a standard cell row (rt). For example, the possible change in the net capacitance (ncc) can be estimated as:

$$ncc = k_0 \times el \times f + k_1 \times rt \text{ when } cg \leq ct$$

$$ncc = k_2 \times cg + k_3 \times ncg \text{ when } cg > ct$$

where $k_0$, $k_1$, $k_2$ and $k_3$ are parameters derived based on statistical data. For example, after a number of synthesis solutions are placed and routed using a backend software tool, the actual changes in the net capacitance, between those estimated based on the synthesis solutions and those determined after the design layout, can be determined. The actual changes for these solutions can be correlated with the congestion factors to determine the parameters $k_0$, $k_1$, $k_2$ and $k_3$. Any curve fitting techniques can be used to derive parameters $k_0$, $k_1$, $k_2$ and $k_3$ based on the actual changes after the design layout for prior design solutions (e.g., based on a set of different circuits, a number of prior iterations for a given circuit, or others). It is understood that curve fitting techniques can also be used to determine the form of the formula for the estimation of the possible change in the net capacitance. Thus, expressions (or equations) that are different from the one illustrated above can also be used, which may require a different number of statistics based parameters.

Note that the change in net length can also be determined in a similar fashion. When the congestion factor may not be estimated (e.g., when the location information about the instances of the elements of the circuit is not available), the congestion factor can be set to a value smaller than the congestion threshold so that the estimated change in net capacity (or net length) is not based on the congestion factors.

A timing objective parameter (e.g., delay, slack, or other) is typically the function of the net capacitance. Thus, a change in the net capacitance can be used to determine the change in the timing objective parameter.

A sensitivity factor can be determined from: i) the timing objective parameter without considering the possible change ($t_{obj}$); and, ii) the timing objective parameter with the possible change ($t_{obj}''$). Further, a threshold value for the timing objective parameter ($t_{obj}^t$) can be used in determining the sensitivity factor. For example, the threshold value can be the limit for the timing objective parameter, exceeding which results in a violation in a timing constraint. For example, a sensitivity factor (sf) can be evaluated as:

$$sf = (t_{obj}'' - t_{obj})/t_{obj}^t$$

Thus, the sensitivity factor increases as the change in the timing objective parameter increases with respect to a reference value (e.g., the threshold value) due to the possible change in the implementation.

It is understood that various alternative sensitivity factor definitions can be used to quantify the sensitivity and to indicate the probability of constraint violation in the subsequent implementation. For example, a formulation can be used to indicate a higher sensitivity for instances with a timing objective closer to the threshold, such as:

$$sf = \frac{(t_{obj}^n - t_{obj})^2}{t_{obj}^t \times (t_{obj}^t - t_{obj})}$$

In one embodiment, the sensitivity factor is used to select the portion of the circuit design for modification (or design transformation). For example, in an instance based approach, the sensitivities for the timing parameter due to individual instance elements are evaluated to determine the sensitive elements for modification; and, in a path based approach, the sensitivities for the timing parameter due to the instance elements on individual paths are evaluated to determine sensitive paths (and the sensitive elements on the paths) for modification. Further, a subset of sensitive elements can be selected from a sensitive path for modification.

Alternatively, the path sensitivity of an instance can be determined from performing a forward and backward breadth first traversal of all paths starting from the timing end points in the design. The set of timing end points includes the latches, registers, flip flops and I/O ports. For example, determining the path sensitivity $s^{path}$ includes:

a) calculating the instance sensitivity ($s^{instance}$) at every instance in the design;

b) performing a backward breadth first traversal to compute the backward path sensitivity ($s^{backward}$) at instance I that has drive instances $J_n$ (n=0, 1, . . . , N) such that:

$$s^{backward}(I) = s^{instance}(I) + \text{Max}(s^{backward}(J_0), s^{backward}(J_1), \ldots, s^{backward}(J_N));$$

c) similarly, performing a forward breadth first traversal to compute the forward path sensitivity ($s^{forward}$) at instance I that has load instances $J^m$ (m=0, 1, . . . , M) such that:

$$s^{forward}(I) = s^{instance}(I) + \text{Max}(s^{forward}(J_0), s^{forward}(J_1), \ldots, s^{forward}(J_M));$$

d) determining the path sensitivity for instance I from:

$$s^{path}(I) = \text{Max}(s^{forward}(I), s^{backward}(I)).$$

Note that a drive instance generates output as direct input to its load instances; and, a load instance receives input directly from its drive instances.

It is understood that there are many ways to define the sensitivity for an instance or a path. For example, a fully probabilisticapproach may be used to determine the probability and mean expectation of the change in the timing parameter, from which a sensitivity indicator is determined, although the evaluation of the probability and mean expectation may be computational intensive. Alternatively, sensitivity indicators can be evaluated based on deterministic changes, identified according to a number of factors, such as the change in net length due to a likely re-route to avoid a congested area. Further, statistics based parameters and deterministically determined parameters, such as congestion factors, can be combined to formulate empirical formula for the sensitivity factors. For example, during a synthesis, a net length may be determined from a wire load table according to fanout and block size of the net. It may be assumed that a certain percentage of change based on the looked up value is the possible change in the net length. Alternatively, the mean values of the changes in the net length can be developed with the wire load table, so that the possible change can also be looked up according to fanout and block size.

In a path based approach, the probability that a path delay could cause a violation in a timing objective is evaluated. For example, the timing objective for a path with many low drive cells is more likely to be violated than a path with only a few low drives. While it is difficult to exactly evaluate the probability of the violation in the timing objective, heuristic approaches can be used to determine indicators that indicate the probability of the violation in the timing objective. For example, deterministic changes for all net segments for a path can be identified and incorporated into the evaluation of the new timing objective for the path in determining the sensitivity in the path, in which the worst case scenario of all the changes being applied for the path in the backend tool is assumed.

To select a minimum set of instances that need to be transformed for the purpose of decreasing the probability of violation in timing objective (and to determine the order to apply the transformation), different selection schemes can be used. For example, the candidates can be selected based on the degree of sensitivity. For example, if a timing objective of an instance (e.g., a delay, or slack for a gate) is sensitive to the change in net length (or net capacitance) of a net, the driving element of the net is selected as a candidate for sizing up. Alternatively, the driving element of the net can be replicated, which effectively sizes up the driving element. After the driving element is replication, the load elements of the original driving element can be partitioned as the load elements of the original and the new driving element. Alternatively, both the original and the new driving elements can drive the load elements together. Similarly, if a timing objective of a path (e.g., a delay along a path) is sensitive to the change in net length (or net capacitance) of one or more nets on the path, the path is selected as a candidate for transformation. Further, the candidates can be selected according to the impact on the design goal. For example, the sensitive elements on the critical or near critical paths can be selected. Furthermore, the sensitive elements can be selected based on the relative importance or scope of influence in the circuit. For example, a sensitive element that is on more paths has a higher priority than a similar element is on less paths.

For example, after a pass of physical synthesis is performed, the legal locations of instances can be determined. Then, a candidate set of sensitive instances can be selected based on a sensitivity criterion. The candidates are sorted based on flow, the number of different paths flowing through each of the candidates. The candidates with larger flow are processed before the candidates with smaller flow are processed. Since sizing up one element may adversely affect other related timing parameters (e.g., the slack of an upstream element), a sizing-up operation is performed only to an extent that will not degrade these related timing parameters to an unacceptable level. Thus, for example, if it is determined that sizing up a candidate does not worsen a design goal (e.g., worst negative slack), the candidate is sized up (e.g., for a predetermined amount); otherwise, the candidate is sized up and buffered (optional) only to an extent that the design goal is not degraded. When a candidate cannot be sized up and buffered to sufficiently reduce the sensitivity (e.g., due to other design constraints), the weakest drive of the candidate is sized up so that it can drive a larger instance in one embodiment of the present invention.

When there are no sensitive instances present in the netlist that is handed off to the backend, one can be assured to a great extent that, even with some variation in the actual route topology, the timing constraints will not be violated (or will have a much smaller chance to be violated) due to the changes (e.g., deviations from the estimations in the synthesis stage) in the critical paths in the design.

In an alternative embodiment of the present invention, a graph is build to represent paths through the sensitive instances; and, a min-cut of the graph can be performed to select the instances for sizing up. A min-cut operation finds a set of minimum elements in a graph which separates the graph in two unconnected portion. Any known algorithms for performing the min-cut operation can be used. The set of sensitive elements on the min-cut represents a subset of minimum sensitive elements that have impact on the communication between two parts of the circuit. Thus, sizing up such a set of sensitive elements on a min-cut is a cost effective way to reduce sensitivity in the circuit design. After the instances in the cut are sized up (e.g., for a predetermined amount, or to an extent that will not worsen the worst negative slack), another min-cut operation can be performed. The min-cut based selection can be performed iteratively or in combination with other selection schemes. In one example, the graph represents the positioning of the sensitive instances on the paths passing through the signal paths; and, non-sensitive instances are not represented on the graph.

From this description, it will be apparent to one skilled in the art that various different selection and ordering schemes (e.g., as illustrated in the examples in this description, with different combinations and variations) can be used to effectively reduce the number of instances that need to be sized up and to increase the cost effectiveness of sizing up the instances.

Figure 2:
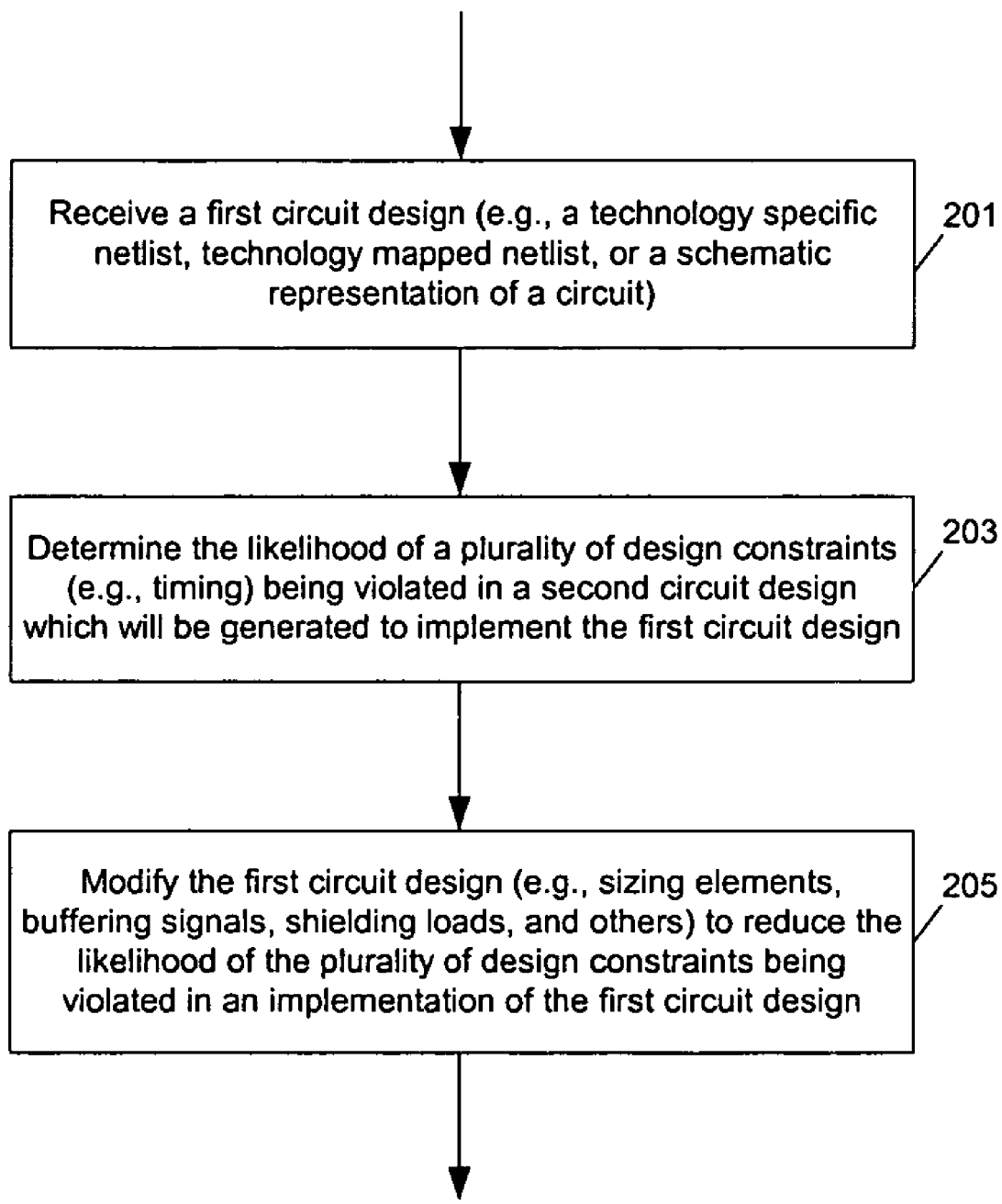
FIG. 2 shows a method to design a circuit according to one embodiment of the present invention.

FIG. 2 shows a method to design a circuit according to one embodiment of the present invention. After operation 201 receives a first circuit design (e.g., a technology specific netlist, technology mapped netlist, or a schematic representation of a circuit), operation 203 determines the likelihood of a plurality of design constraints (e.g., timing) being violated in a second circuit design which will be generated to implement the first circuit design. For example, the likelihood of the timing constraints being violated after the detailed design layout (e.g., after placement and routing) can be determined for a synthesis solution. Operation 205 modifies the first circuit design (e.g., sizing elements, buffering signals, shielding loads, and others) to reduce the likelihood of the plurality of design constraints being violated in an implementation of the first circuit design.

Figure 3:
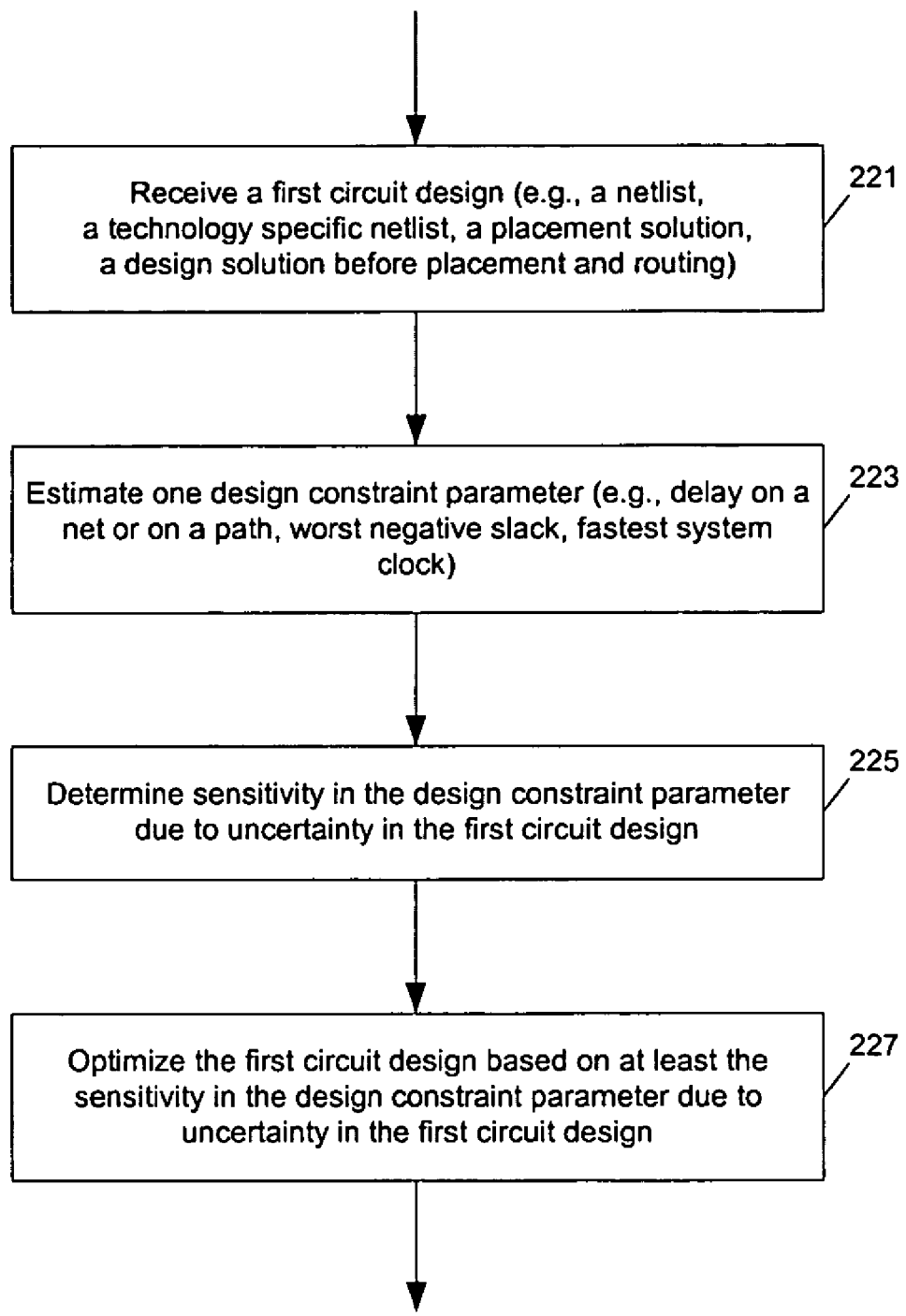
FIG. 3 shows a method to optimize a circuit according to one embodiment of the present invention.

FIG. 3 shows a method to optimize a circuit according to one embodiment of the present invention. After operation 221 receives a first circuit design (e.g., a netlist, a technology specific netlist, a placement solution, a design solution before placement and routing), operation 223 estimates one design constraint parameter (e.g., delay on a net or on a path, worst negative slack, fastest system clock) for the first circuit design. Operation 225 determines sensitivity in the design constraint parameter due to uncertainty in the first circuit design. For example, the changes in timing parameters due to a route determined in the routing software tool that is different from the route estimated by the synthesis tool (e.g., due to detour to avoid a congested area, or deviation from the estimation). Operation 227 optimizes the first circuit design based on at least the sensitivity in the design constraint parameter due to uncertainty in the first circuit design. The optimization can also be based on the cost effectiveness of the modifications, tolerated level of degradation in related design parameters, whether or not the sensitivity is critical, and others.

Figure 4:
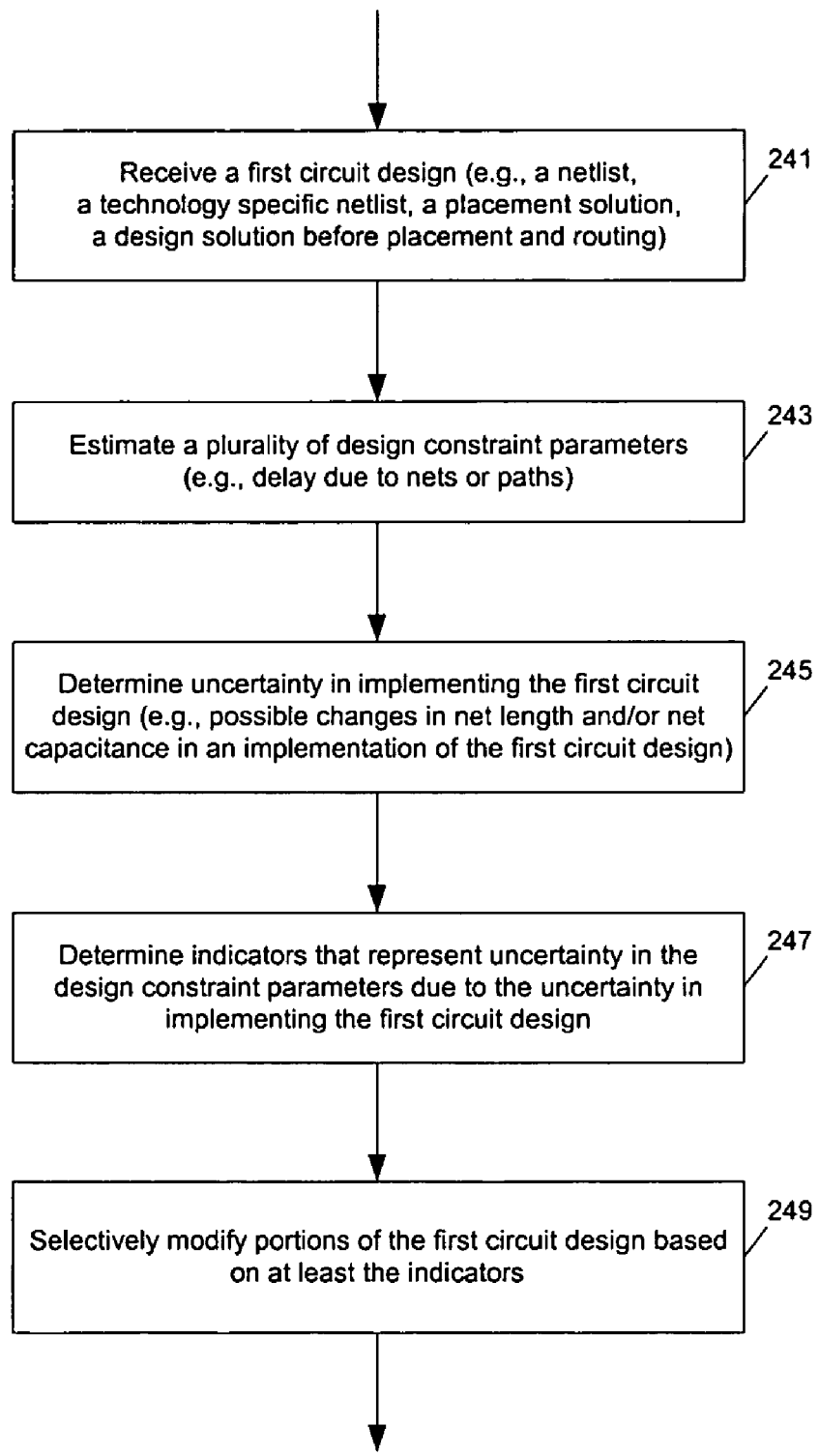
FIG. 4 shows a detailed method to optimize a circuit according to one embodiment of the present invention.

FIG. 4 shows a detailed method to optimize a circuit according to one embodiment of the present invention. After operation 241 receives a first circuit design (e.g., a netlist, a technology specific netlist, a placement solution, a design solution before placement and routing), operation 243 estimates a plurality of design constraint parameters (e.g., delay due to nets or paths). Operation 245 determines uncertainty in implementing the first circuit design (e.g., possible changes in net length and/or net capacitance in an implementation of the first circuit design). Operation 247 determines indicators (e.g., sensitivity factors) that represent uncertainty in the design constraint parameters due to the uncertainty in implementing the first circuit design. Operation 249 selectively modifies portions of the first circuit design based on at least the indicators.

Figure 5:
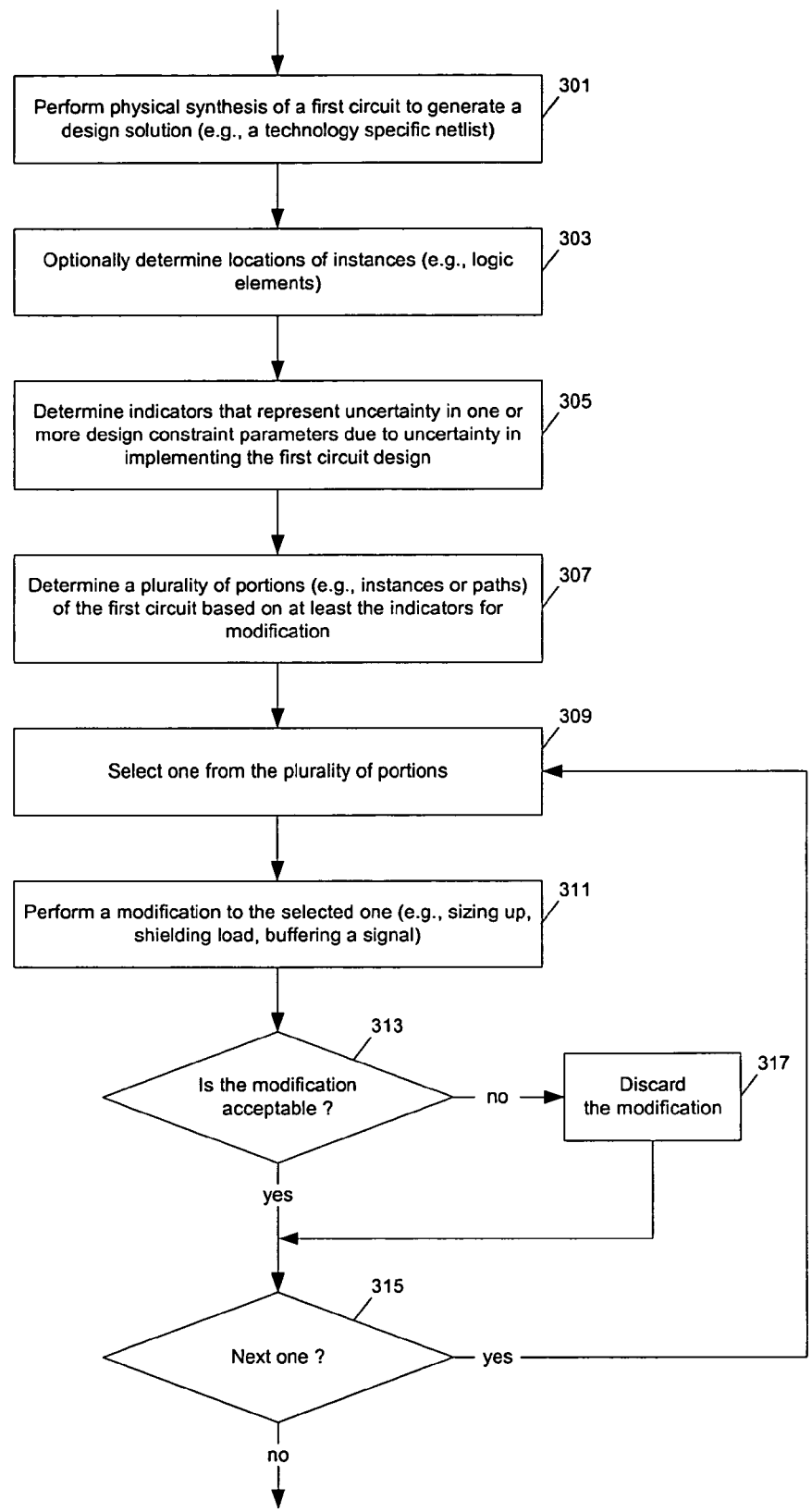
FIGS. 5-6 show detailed methods to selectively modify a circuit according to embodiments of the present invention.
Figure 6:
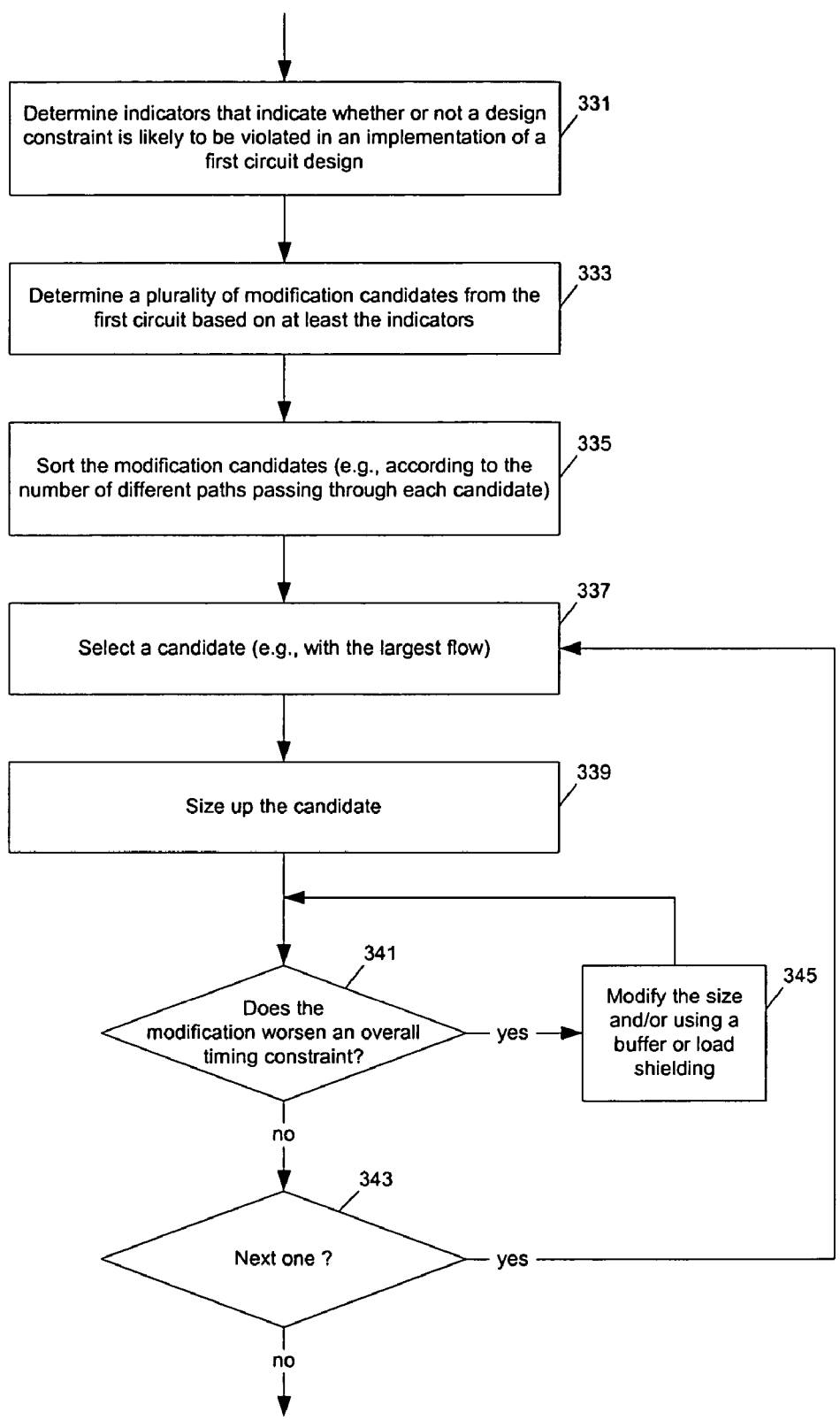

FIGS. 5-6 show detailed methods to selectively modify a circuit according to embodiments of the present invention.

In FIG. 5, operation 301 performs physical synthesis of a first circuit to generate a design solution (e.g., a technology specific netlist). Operation 303 optionally determines locations of instances (e.g., logic elements). Operation 305 determines indicators that represent uncertainty in one or more design constraint parameters due to uncertainty in implementing the first circuit design. Operation 307 determines a plurality of portions (e.g., instances or paths) of the first circuit based on at least the indicators for modification. Operation 309 selects one from the plurality of portions (e.g., selecting one instance with more flow, or selecting a set of sensitive elements on a min-cut, or selecting a sensitive instance from a sensitive path). In one embodiment, the selection is based on the indicators determined in operation 305. For example, the one with most sensitive indicator is selected for transformation first. Operation 311 performs a modification to the selected one (e.g., sizing up, shielding load, buffering a signal). If operation 313 determines that the modification is acceptable (e.g., the modification to the selected one does not degraded the worst negative slack), operation 315 proceeds to select the next one for modification; otherwise, operation 317 discards the modification to process another candidate.

In FIG. 6, operation 331 determines indicators that indicate whether or not a design constraint is likely to be violated in an implementation of a first circuit design. Operation 333 determines a plurality of modification candidates from the first circuit based on at least the indicators. Operation 335 sorts the modification candidates (e.g., according to the flow, the number of different paths passing through each candidate). Operation 337 selects a candidate (e.g., with the largest flow). Operation 339 sizes up the candidate. If operation 341 determines that the modification worsen an overall timing constraint, operation 345 modifies the size and/or using a buffer or load shielding (or apply other design transformation); otherwise, the next candidate is selected for sizing. In one embodiment, when the candidate cannot be sized up or buffered to reduce the sensitivity (or to sufficiently reduce the sensitivity), the weakest drive of the candidate is sized up.

In one embodiment of the present invention, the loop of selecting a candidate for modification (e.g., operations 315 to 309 in FIG. 5, or operations 343 to 337 in FIG. 6) continues until a maximum utilization limit is reached or the improvement in reducing the sensitivity is below a threshold value. For example, a maximum area usage constraint (or maximum increase of area usage) can be used to stop the iteration of selecting candidates for sizing up and/or for buffering. Further, when the sizing up and/or buffering of the candidates provides very limited improvement in sensitivity, the iteration can be terminated.

Although various examples of the present invention are illustrated with a timing constraint as a design constraint, from this description, it will be apparent to one skilled in the art that various methods of the present invention can also be used for selectively transforming portions of an early stage design (e.g., sensitive instances) to reduce the likelihood of other design constraints being violated in a late stage design that is based on the early stage design. Sensitivity analysis is performed to determine the sensitivity of the instances in design rule violations (such as maximum capacitance, maximum transition, and/or maximum crosstalk in the circuit). To reduce the likelihood of these design rules (or constraints) being violated, transformation (e.g., sizing) can be selectively performed based on the sensitivity of portions of the circuit (e.g., instances or paths).

While most embodiments of the present invention are intended for use in an HDL design synthesis software program, the invention is not necessarily limited to such use. Use of other languages and computer programs is possible. For example, a computer program may be written to describe hardware and thus be considered an expression in an HDL. Alternatively, the invention, in some embodiments, may allocate and reallocate a logic representation, e.g. a netlist, which was created without the use of an HDL.

Embodiments of the present invention will be described in the context of, but not limited to, use in HDL synthesis systems, and particularly those designed for use with integrated circuits which have vendor-specific technology/architectures. As is well known, the target architecture is typically determined by a supplier of ICs. Embodiments of the present invention can be employed with application-specific integrated circuits (ASICs), including Structured ASICs and Platform ASICs, from vendors such as LSI Logic, NEC, IBM, Artisan Components Inc. Certain embodiments of the present invention can also be employed with programmable ICs. An example of one target architecture is the programmable lookup tables (LUTs) and associated logic of the integrated circuits which are field programmable gate arrays from Xilinx, Inc. of San Jose, Calif. Other examples of target architecture/technology include those well known architectures in field programmable gate arrays and complex programmable logic devices from vendors such as Altera, Lucent Technology, Advanced Micro Devices, and Lattice Semiconductor.

During physical synthesis, a route estimator may be used to predict the wire capacitance, wire resistance, and pin-to-pin delays, which may be precisely determined only after a detailed routing is performed using a backend design software program. A route estimator is typically used because keeping a complete detailed route up-to-date during synthesis may take too many resources (e.g., computation time and memory usage). Accurate predictions of the net delays during synthesis can improve the correlation between the timing determined using the detailed information from the backend tools and the timing perditions of the synthesis tool. However, net delays are highly dependent on the net route topology. Under certain conditions (e.g., as the number of fanout of the net increases), the net route topology that will be used in the backend tool becomes unpredictable.

Figure 7:
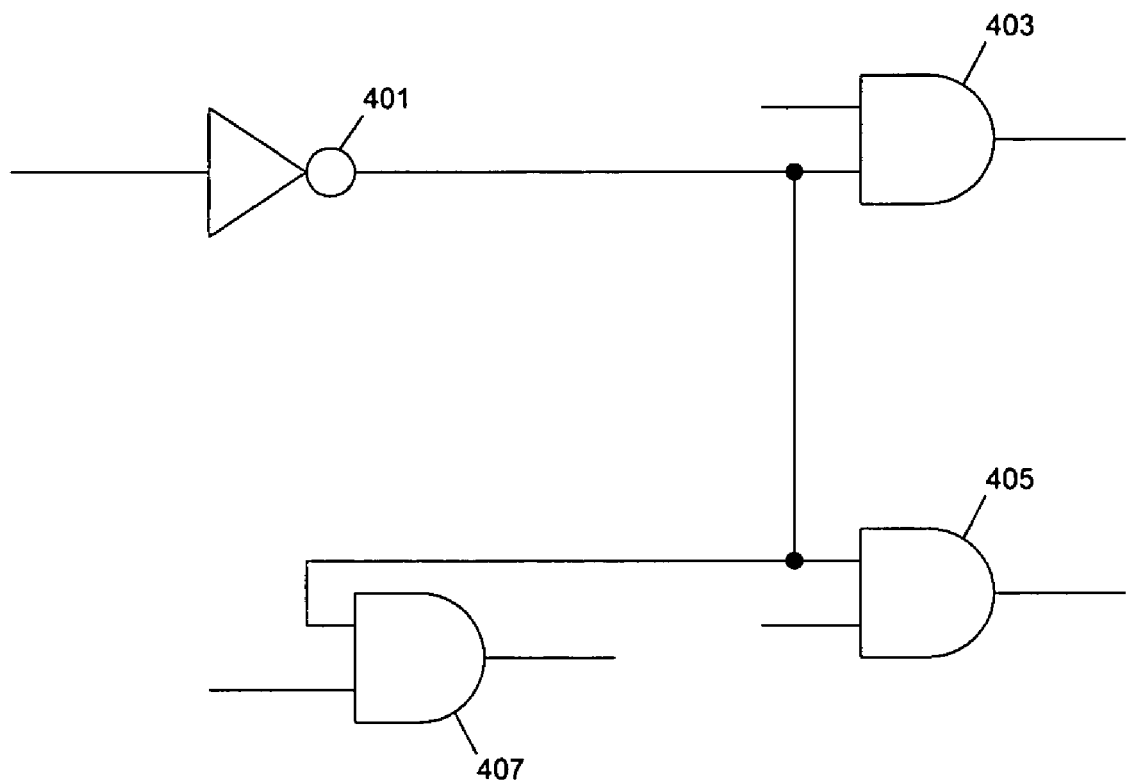
FIGS. 7-8 illustrate the uncertainty in estimating a wire length due to the uncertainty in route topology.
Figure 8:
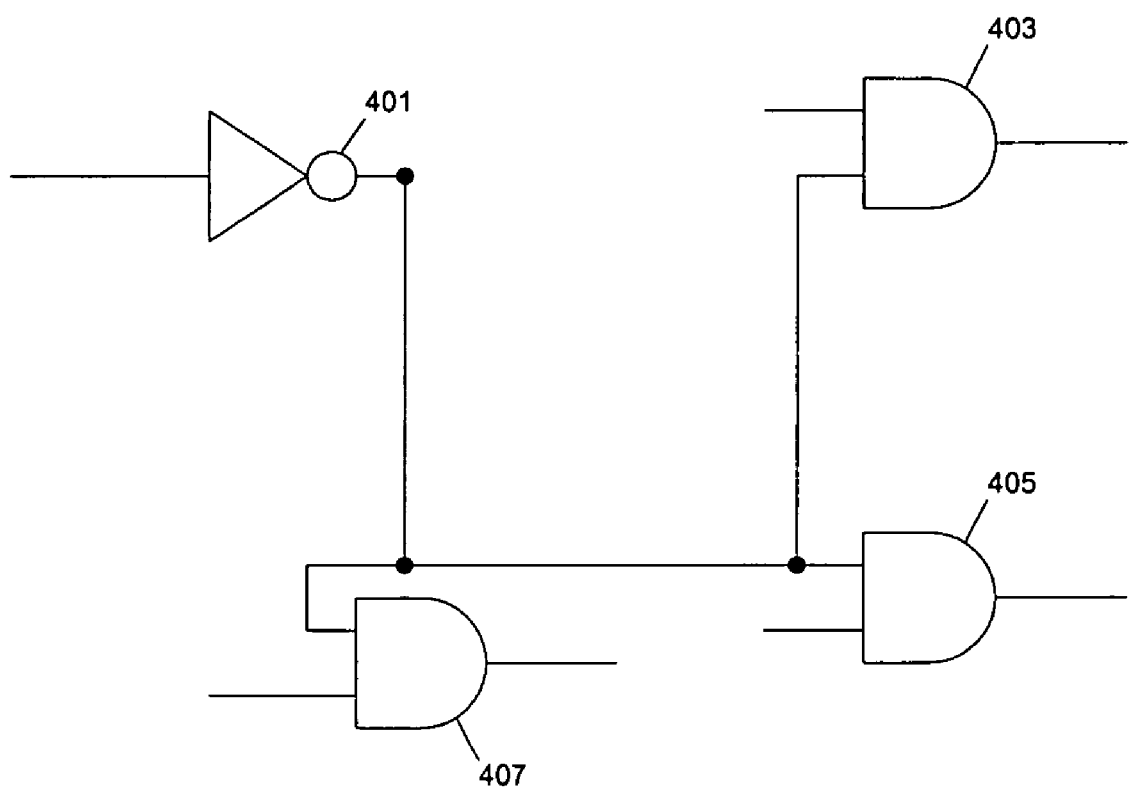

FIGS. 7-8 illustrate the uncertainty in estimating a wire length due to the uncertainty in route topology. There are often many possible route topologies that have the same total wire length. In FIG. 7, the net connecting drive element 401 and load elements 403-407 is routed in a clockwise direction. In FIG. 8, the net connecting drive element 401 and load elements 403-407 is routed in a counter-clockwise direction. Although the total wire length for the net is the same for the route topologies in FIGS. 7 and 8, the distance between load elements 403 and 407 vary significantly if the different route topologies illustrated in FIGS. 7 and 8 are used. The different route topologies in FIGS. 7 and 8 yield very different distances, and thus resistance values, for load elements 403 and 407, even though the total wire length remains the same. Since many backend tools try to minimize the total wire length in routing the net, it is difficult for the synthesis tool to predict which one of the different route topologies in FIGS. 7 and 8 may be used in a backend tool. For example, one backend tool may use the topology in FIG. 7 while another backend tool may use the topology in FIG. 8. The uncertainty in the route topology may cause a backend tool to generate a solution that does not satisfy the timing requirement, since the backend tool may route the net using a route topology that is different from the estimation of the synthesis tool.

Figure 9:
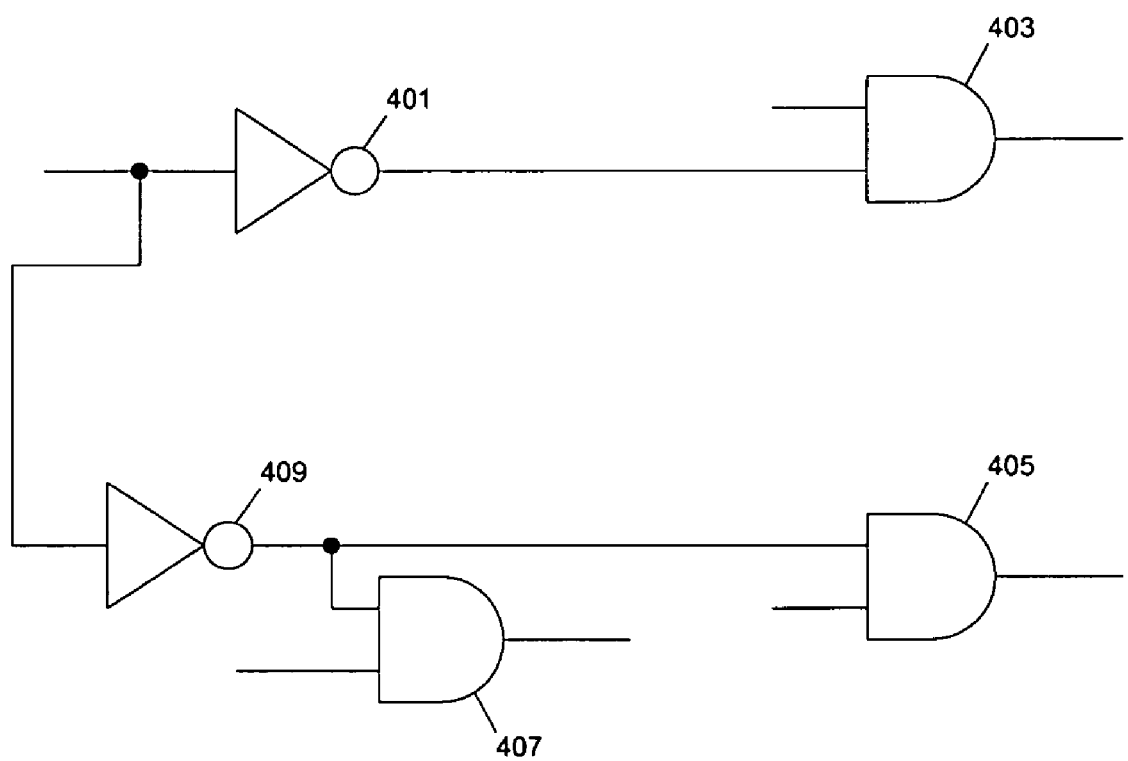
FIG. 9 illustrates a method to reduce uncertainty in route topology according to one embodiment of the present invention.

FIG. 9 illustrates a method to reduce uncertainty in route topology according to one embodiment of the present invention. In FIG. 9, replicated drive element 409 is a replication of original drive element 401. The net of the original drive element is transformed to partition the load elements 403-407 for the driver elements 401 and 409. After the transformation, the original drive element 401 drives only element 403; and the replicated drive element drives elements 405 and 407. Thus, the expected route topology that will be used in the backend routing tool becomes clear. The sensitivity to the route topology is reduced.

There are a number of causes of uncertainty in route topology. A backend detailed router (e.g., a maze router or a channel router) may use a different algorithm to route the nets as compared to the global router estimator embedded in the synthesis tool, and hence route the load elements on the net in a different sequence. It is also possible that minor variations in estimates of wiring congestion can lead to different choices. This variation may cause significant variation in timing, especially for high fanout nets. Therefore, the predicted wire delay between a drive element to a load element could be far different from the one that is determined after detailed route and extraction. Due to the uncertainty in the route topology, the driver-load path delay modeled in the synthesis tool might not correlate well with the driver-load delay determined in the backend after the routing of the design.

There exist algorithms to increase the chances that the routing performed the backend router tool will correlate with the routing estimated during physical synthesis. The physical synthesis tool may provide information about the routing in the form of forward annotation. Forward annotation may include net route ordering and anchor cells, aimed at minimizing net delay correlation problems that could be caused by net detours. However, traditional synthesis tools do not consider the effects of the order of load elements on the net delay correlation.

To minimize this correlation problem, one embodiment of the present invention selectively picks nets that have a potential to cause the correlation problem and transforms them in a prioritized order. These transformations minimize the uncertainty on the net delay by decreasing the number of fanout and skewing the shape of the net. Detail methods that improve delay correlation while ensuring that the cost criteria are satisfied are described below.

In one embodiment of the present invention, a route topology variation minimization algorithm is used to find and transform a set of nets whose delays are sensitive to the route topology. The transformation reduces the chances of timing violation when a different route topology is used in the backend router, particularly in the case that an alternative route topology used in the backend router may create different delay characteristics to pins on the net than those predicted during physical synthesis. In one embodiment, the net selection and transformation algorithm examines all nets in the design until no new nets can be transformed to reduce sensitivity in a manner that will not worsen a pre-determined cost function. Thus, a physical synthesis design of the circuit is optimized with reduced chances of having an invalid subsequent routing implementation when a backend routing tool is used to route the design.

In one embodiment, the cost function is based on one or more of the following: the worst negative slack, the total negative slack, total wire length of the net that is being transformed, the peak utilization limit and the maximum allowed area increase on the design. It is understood that different cost functions can be constructed for different emphasizes in the optimization process. The transformations for the optimization process do not violate the logic and physical constraints that are specified by the user.

In one embodiment of the present invention, a set of logic and physical optimizations are used to transform the nets for the reduction of sensitivity to route topologies. For example, the logic connected to the net may be transformed through replication, sizing, buffering and changing of placement. If the driver of the net can be replicated, the replication transformation is used to split the sinks of the net (load elements of the driver of the net). If a replication transformation is not allowed (e.g., because of design constraints), the net may be buffered so that the new buffer drives some of the sinks of the net. Sizing of the replicated instance (or the buffer) and the original driver can be done such that the cost function does not worsen.

When new instances are created by the transformations, they are placed on the die in legal locations. In one embodiment, the cost function is checked before and after the legalization of the changes. The changes are reversed if the cost function worsens. For example, if the worst negative slack on a path worsens after the transformation, the transformation is reversed.

In one embodiment of the present invention, alternate possible route topologies are examined for each net to select the nets for transformation. A typically wire length driven router attempts to create a valid route that minimizes the total wire length and congestion in a particular area. Such a wire length driven router may used any one of a number of different route topologies which have very different delay characteristics, but nearly equivalent wire length and congestion properties. A typically timing driven router attempts to minimize delays. However, even a timing driven router may use alternate topologies in order to minimize congestion or other costs. Timing driven routing can be too costly to run on an entire design. Because congestion may also vary based on route algorithms and small variations in the design, even if the algorithm that will be used in the backend routing tool is known, it may still be difficult to predict the actual route. Thus, one embodiment of the present invention examines possible topologies that are likely to be used by various route algorithms to determine whether any of these routes will violate design constraints (e.g., timing requirements). After identifying of the nets that may subject the validity of the design constraint to the selections of route topologies, transformations can be applied to the design to reduce the chances that the design may become invalid after routing using a backend tool.

Since the effects may build up when several such nets exist on a particular path, one embodiment of the present invention examines sub-paths or paths for variation.

Since determining the possible route topologies accurately can be timing consuming and resource intensive, one embodiment of the present invention uses a number of heuristics to determine the route topology sensitive nets without performing different routing or routing estimation. For example, if a net satisfies a number of the criteria, it is determined to be highly likely to be sensitive to route topology and may have problems with net delay correlation.

In one embodiment, the number of fanout of a net is a primary selection criterion. When the number of fanout increases, the sink order can have a higher impact on the variation in the delay model. In one example, a net is considered for reduction in route topology sensitivity only when the number of fanout of the net is larger than a threshold value (e.g., two). When the number of fanout is small (e.g., less or equal than two), the net may be considered as non-sensitive to route topologies.

The shape of the net can also have an impact on the possibility of alternative route topologies. For example, when the shape of the net is close to a square, there would be more choices for the router to pick the routing order of sinks; and hence, the delay to the sinks of the net may be more unpredictable. This is particularly true for wire-length driven routers, since delays to individual sinks on a square shaped net may vary greatly with the order in which the sinks are connected, even though the total wire length remains fairly constant, as illustrated in FIGS. 7 and 8. Thus, in one embodiment, the nets are also selected for transformation using a shape skew criterion.

Figure 10:
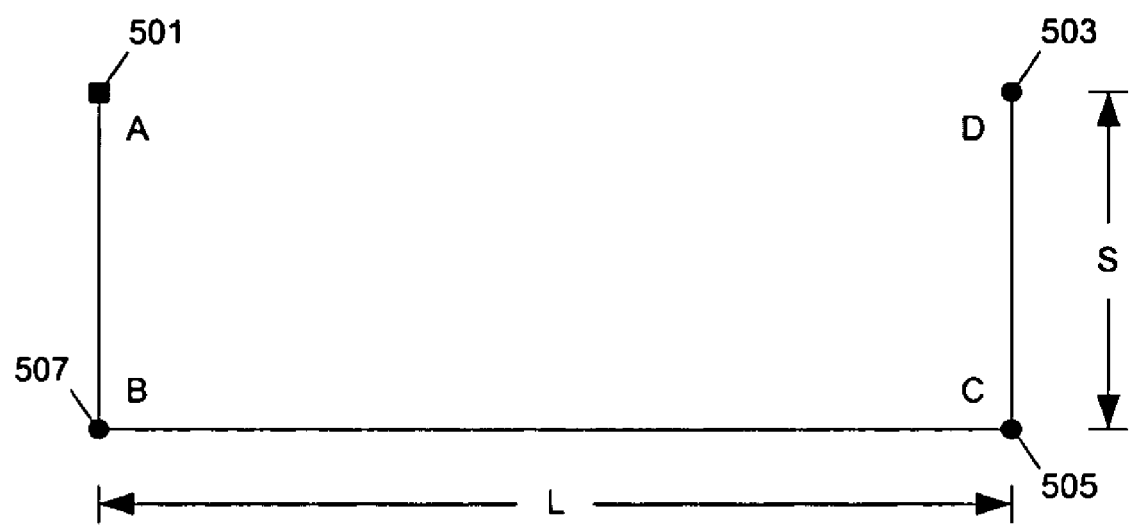
FIGS. 10-12 illustrate methods to estimate the variation of wire length due to uncertainty in route topology according to one embodiment of the present invention.
Figure 11:
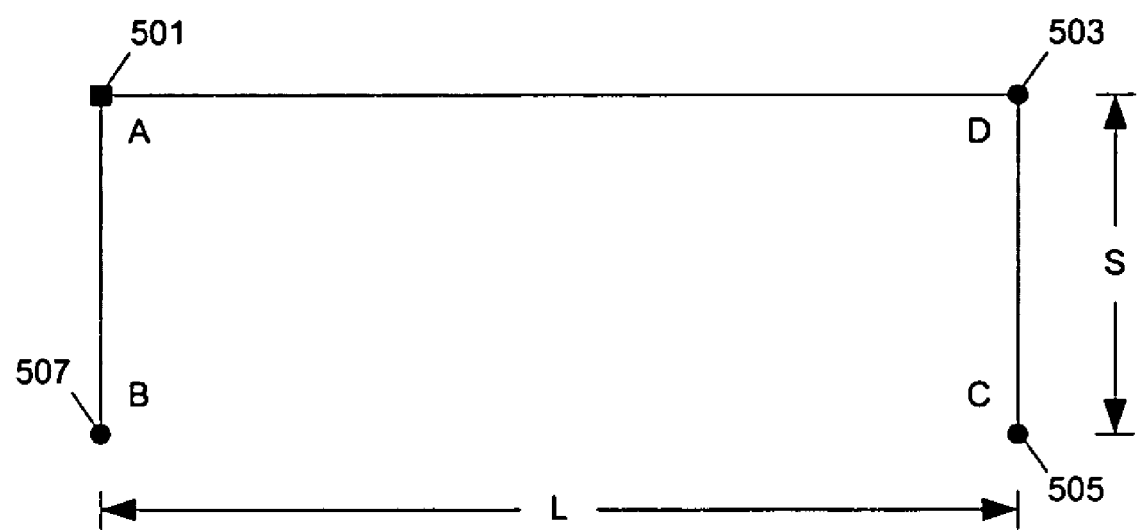
Figure 12:
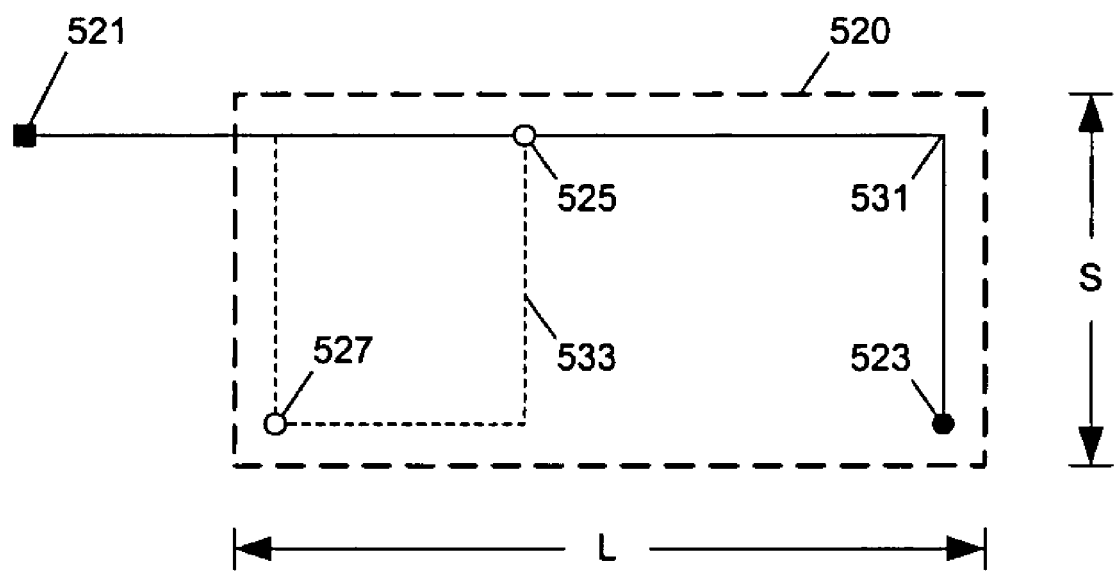

FIGS. 10-12 illustrate methods to estimate the variation of wire length due to uncertainty in route topology according to one embodiment of the present invention. FIG. 10 illustrate a net of a rectangular shape with a short side of length S and a long side of length L. The position of the drive element (A 501) and the positions of the load elements (B 507, C 505 and D 503) determine the shape of the net. Since a backend router will typically minimize the total wire length, it is typically that the routing of the net includes detour in the direction of the short side rather than along the long side of the shape of the net. For example, the route from A(501) to B (507) to C (505) to D (503) illustrated in FIG. 10 includes a detour in the direction of the short side for D (503), as compared to the route from A(501) to D(503) to C (505) illustrated in FIG. 11. A detour in the direction of the short side of the shape of the net would increase the wire length by two times the length of the short side of the bounding box of the net. Thus, in one embodiment of the present invention, the length of the short side of the bounding box of the net, determined from the positions of the load elements, is used to estimate the variation of the wire length due to variations in route topology.

FIG. 12 illustrates the effect of a detour in the direction of the short side of a bounding box. In FIG. 12, bounding box 520 encloses the load elements (e.g., 523-527) of the drive element (521). Route 531 (solid line) shows the Manhattan distance (also known as rectilinear distance) between the driver 521 and load 523. The Manhattan distance is typically the lower bound of the wire distance between the driver and the load. Route 533 (broken line) shows a detour to connect elements 527 and 525 before element 523, which approximately increases the wire length for element 523 by two times the length of the short side (S) of the bounding box (520) over the Manhattan distance. Thus, in one embodiment of the present invention, the Manhattan distance and the length of the short side (S) of the bounding box are used to estimate the wire length (the distance between two logic elements) in the consideration of the different route topology.

In one embodiment, the distance between a drive element and a load element is estimated based on the Manhattan distance (also known as rectilinear distance) between the drive element and the load element. In the consideration of the effect of the different route topologies, the distance is further estimated based on the Manhattan distance and the length of the short side of the bounding box of the load elements. For example, a detour along the short side of the bounding box increases the wire length by twice the length of the short side of the bounding box. Thus, the distance may be estimated as $d_M+2 \times S$, where $d_M$ is the Manhattan distance between the drive element and the load element and S is the length of the short side of the bounding box of the load elements. The wire delay can then be estimated as $(d_M+2 \times S) \times D_u$, where $D_u$ is the unit wire delay. In one embodiment, the net is selected as a candidate for transformation when the estimated variation in wire length due to differences in route topology causes the slack to become negative (or worsen the worst negative slack on a path).

Note that different formulations may be used to model the distance variation due to variation in route topology under different situations. For example, the wire delay may be estimated using an empirical formula with coefficients derived from statistical data through curve fitting. Back annotation (or test runs on typical designs) may be used to derive the coefficients for a particular backend software tool. Thus, different formulations may be used for different backend software tools.

The same variation in path delay between a drive element and a load element due to uncertainty in route topology may have very different effects on the timing constraint on different paths. Thus, one embodiment of the present invention selects the nets for transformation further based on the timing requirements. For example, when the driver slack is within a range T for a net on a timing critical or near-critical path, the net is selected for the consideration of route topology sensitivity. Any path that has a better slack may be considered to be unlikely to cause delay correlation problems and hence need not be evaluated. In one embodiment of the present invention, delay estimation correlation for paths with good slack is not considered to be a problem. Thus, only nets on the timing critical or near-critical paths are considered for the reduction of sensitivity to route topology. Additional uncertainty about the final routes, including uncertainty about the amount of congestion, may also be considered. For example, the more accurately the congestion is predicted, the smaller the range of T is required. Further, the value of T could be experimentally determined based on a number of runs of a backend tool on typical designs. Thus, in one embodiment of the present invention, the driver slack is an additional criterion in selecting the nets that could have correlation problems due to net topology.

Other criteria, such as user specified design constraints, may also be used to filter the set of nets that will be selected as candidates for transformation. For example, certain nets may not be transformed according to user specified design constraints.

After a set of net candidates is selected for transformation, the set of nets can be prioritized for transformation. For example, the set of nets may be prioritized according to flow, according to the sensitivity indicators or according to min-cuts on a graph, similar to those described above for the sizing for elements to reduce sensitivity. The flow can be the number of total paths passing through a net candidate, or the number of negative slack paths passing through the net candidate, or the number of congested paths passing through the net candidate, or the number of paths with sensitive nets passing through the net candidate, or a weighted count of the number of paths passing through a net candidate (e.g., weighted based on congestion factors, negative slacks, indicators of sensitivity, etc.). In one embodiment of the present invention, a number of transformations (e.g., buffering, replication, sizing, and rearrangement of placement) are used to mitigate the route topology effects without worsening a cost function for the design.

Typically, I/O ports and macros are excluded from replication. Design constraints, such as those that prevent the verification of the design when the constraints are violated, may also prevent replication in some circumstances. When the replication of a drive instance is allowable (e.g., does not break design constraints, does not worsen the cost function), the net is then transformed. For example, the sinks of the net are partitioned between the original and the replicated drive instances in such a way that the sum of the wire lengths of the new nets is approximately equal to the wire length of the original single net. This preserves the original gate area and wire length while reducing variability. The partitioned nets have a higher skew in terms of the shape of the net so that the bounding boxes of the load elements of the original and the replicated drive instances have reduced aspect ratios. The original and the new drivers are then appropriately sized to minimize the cost.

Buffering is another alternative that may be allowed when replication is not, and that may provide a way to reduce the topology uncertainty without violating cost criteria. In one embodiment, adding an extra buffer along the path is performed only when the extra buffer does not increase the cost of the transformation (e.g., the worst negative slack on the path). When the insertion of a buffer is allowable (e.g., there is a location for the placement of the buffer), the sinks of the net are partitioned to have a portion of the sinks reconnect to the inserted buffer in such a way that the newly created nets have a higher skew in terms of the shape of the net. Thus, after the transformation, the bounding box of the load elements of the original drive and the bounding box of the load elements of the new buffer will have smaller aspect ratios. In addition, the partitioning is in such a way that the sum of the wire lengths of the new nets is approximately equal to the wire length of the original single net in one embodiment. This objective preserves the original gate area and wire length while improving (reducing) variability. The original driver may be further sized to minimize the cost function.

In certain cases, a replication of the driver (or a buffer) may already exist, which may be created during the synthesis process for purposes other than reduction of route topology uncertainty. In such a case, the load elements of these existing elements may be re-distributed or re-partitioned for the reduction of route topology uncertainty without breaking existing design constraints.

In certain cases, the placement locations of the load elements and/or the drive elements can be adjusted to reduce the effect of the uncertainty in route topology. Thus, the placement of the sinks of the net can be altered to reduce the aspect ratio of the bounding box of the load elements (increase the skew in the shape of the net).

Thus, in one embodiment of the present invention, a modest number of nets are selected for modification. Since the modifications try to maintain a near constant wire length and gate area, the routability and cost of the modified design remain similar to the unmodified design, while the chances of getting an invalid design after the routing are reduced.

Figure 13:
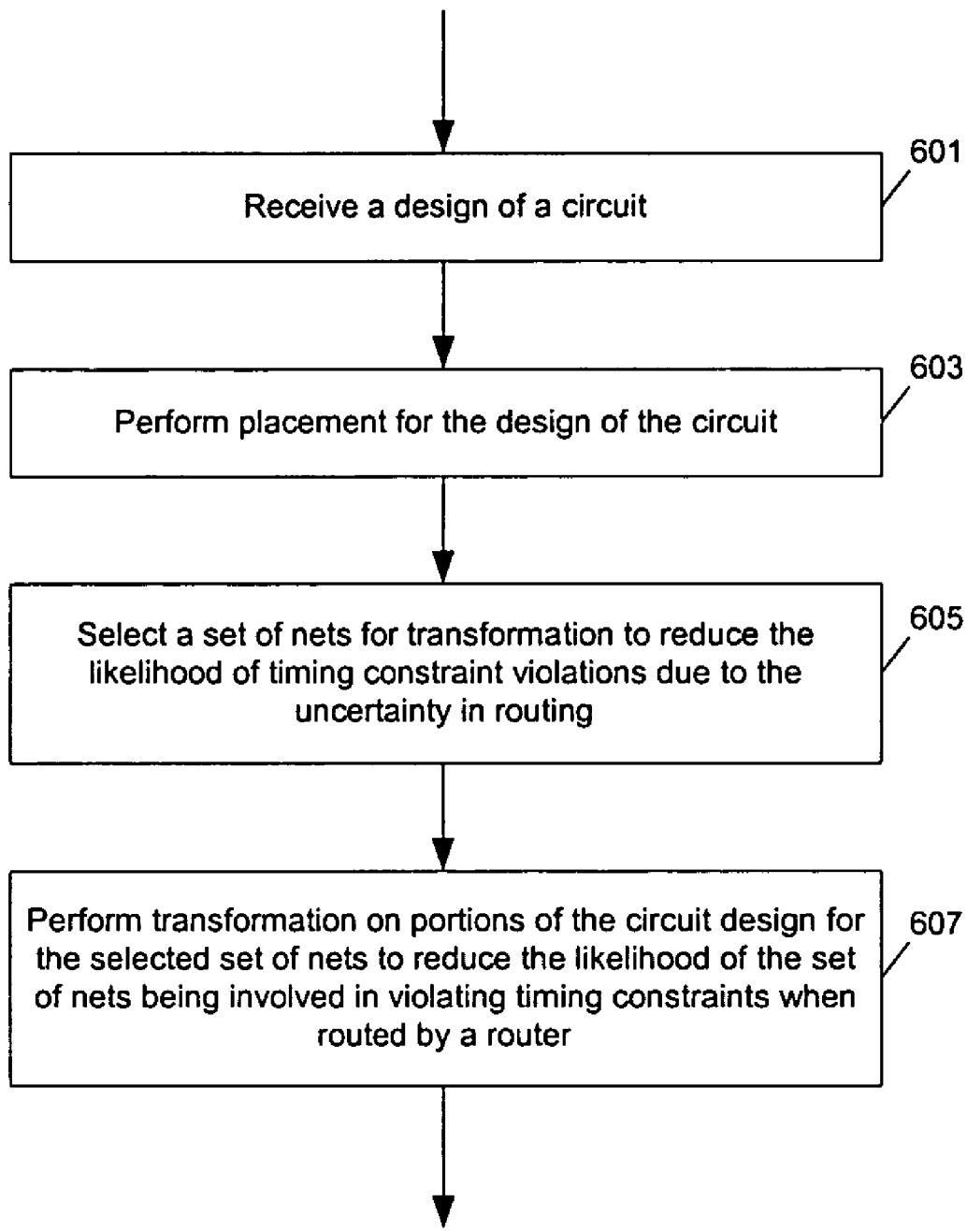
FIG. 13 illustrates a method to design a circuit according to one embodiment of the present invention.

FIG. 13 illustrates a method to design a circuit according to one embodiment of the present invention. After operation 601 receives a design of a circuit (e.g., a netlist representation of the logic synthesis solution of the circuit), operation 603 performs placement for the design of the circuit. Operation 605 selects a set of nets for transformation to reduce the likelihood of timing constraint violations due to the uncertainty in routing. Operation 607 performs transformation on portions of the circuit design for the selected set of nets to reduce the likelihood of the set of nets being involved in violating timing constraints when routed by a router. In one embodiment of the present invention, the transformation is performed to the extent that the wire length and gate area remain substantially the same while reducing the uncertainty in route topologies that may be used by backend routing tools, especially the route topology uncertainty that may lead to a routing solution that does not satisfies timing constraints.

Figure 14:
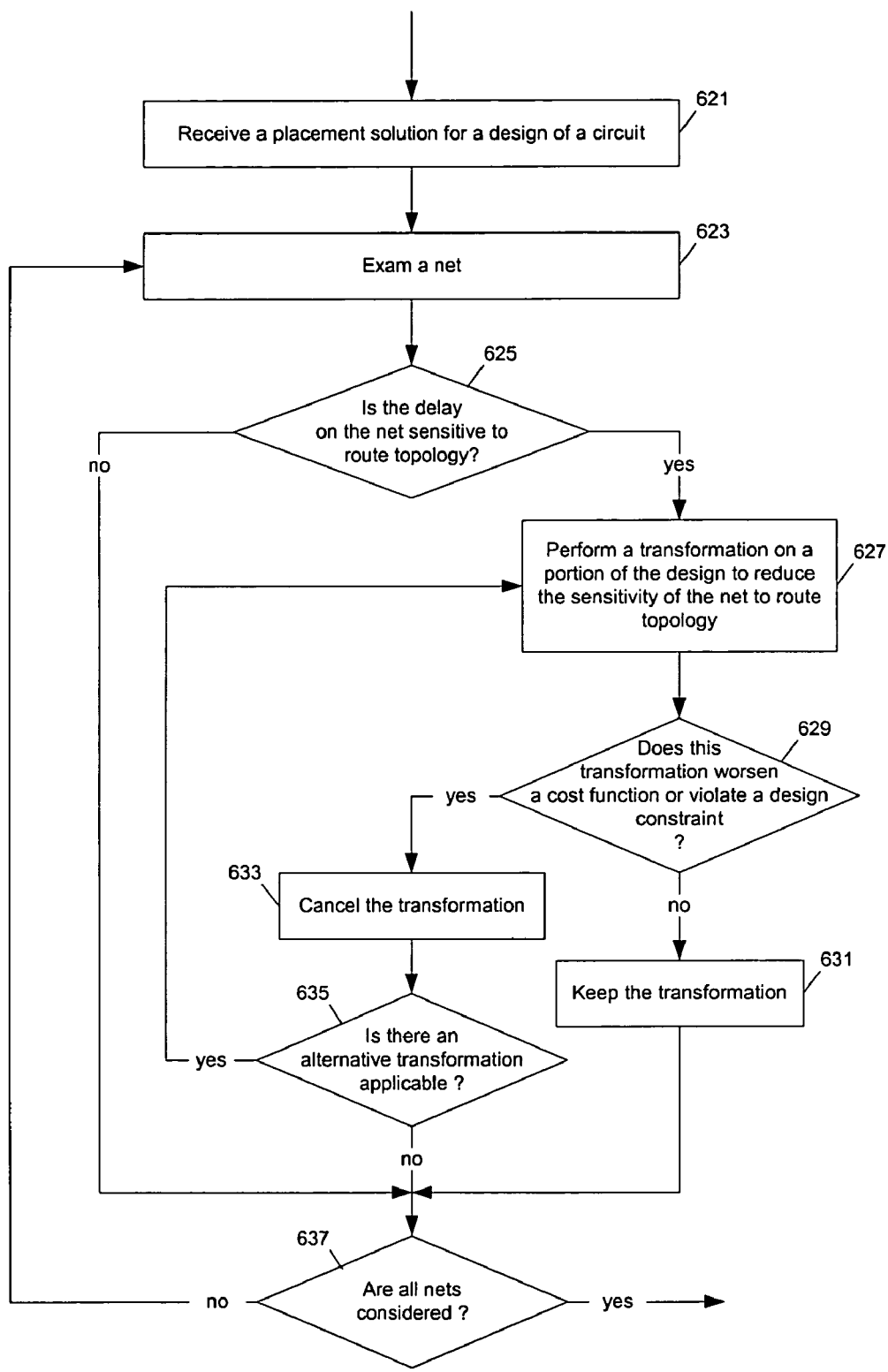
FIG. 14 illustrates a method to optimize a circuit design according to one embodiment of the present invention.

FIG. 14 illustrates a method to optimize a circuit design according to one embodiment of the present invention. After operation 621 receives a placement solution for a design of a circuit, operation 623 exams a net for the reduction of sensitivity to route topology. If operation 625 determines that the delay on the net is sensitive to route topology, operation 627 performs a transformation on a portion of the design to reduce the sensitivity of the net to route topology. For example, the drive element may be replicated; or a buffer may be inserted; or the placement of the elements may be altered; or the load elements may be redistributed to an existing replicated drive (or buffer). If operation 629 determines that this transformation worsens a cost function or violates a design constraint (e.g., lack of area for the placement of a newly inserted element), operation 633 cancels (or reverses) the transformation; otherwise, the transformation is kept (631). When the sensitivity is not already successfully reduced, operation 635 determines if there is an alternative transformation applicable. A list of transformations may be tried to reduce the route topology sensitivity of the net while not worsening the cost function and not breaking design constraints. Each net is considered for the reduction of the sensitivity to route topology until operation 637 determines are nets have been considered.

In one embodiment of the present invention, a number of criteria are used to estimate if the delay on the net is sensitive to route topology. For example, a net has a number of fanout less than three may be considered not sensitive to route topology. Further, when the driver of a net has a slack above a threshold value may be considered not sensitive to route topology. Further, when an extra estimated distance due to a variation in route topology (e.g., twice the length of the short side of the bounding box of the load elements) does not cause a slack to become negative (or worse than a worst negative slack on a path), the net may be considered not sensitive to route topology. Thus, the sensitive of the nets to route topology are efficiently evaluated without performing detailed routing using different algorithms, nor determining the actual different route topologies.

Figure 15:
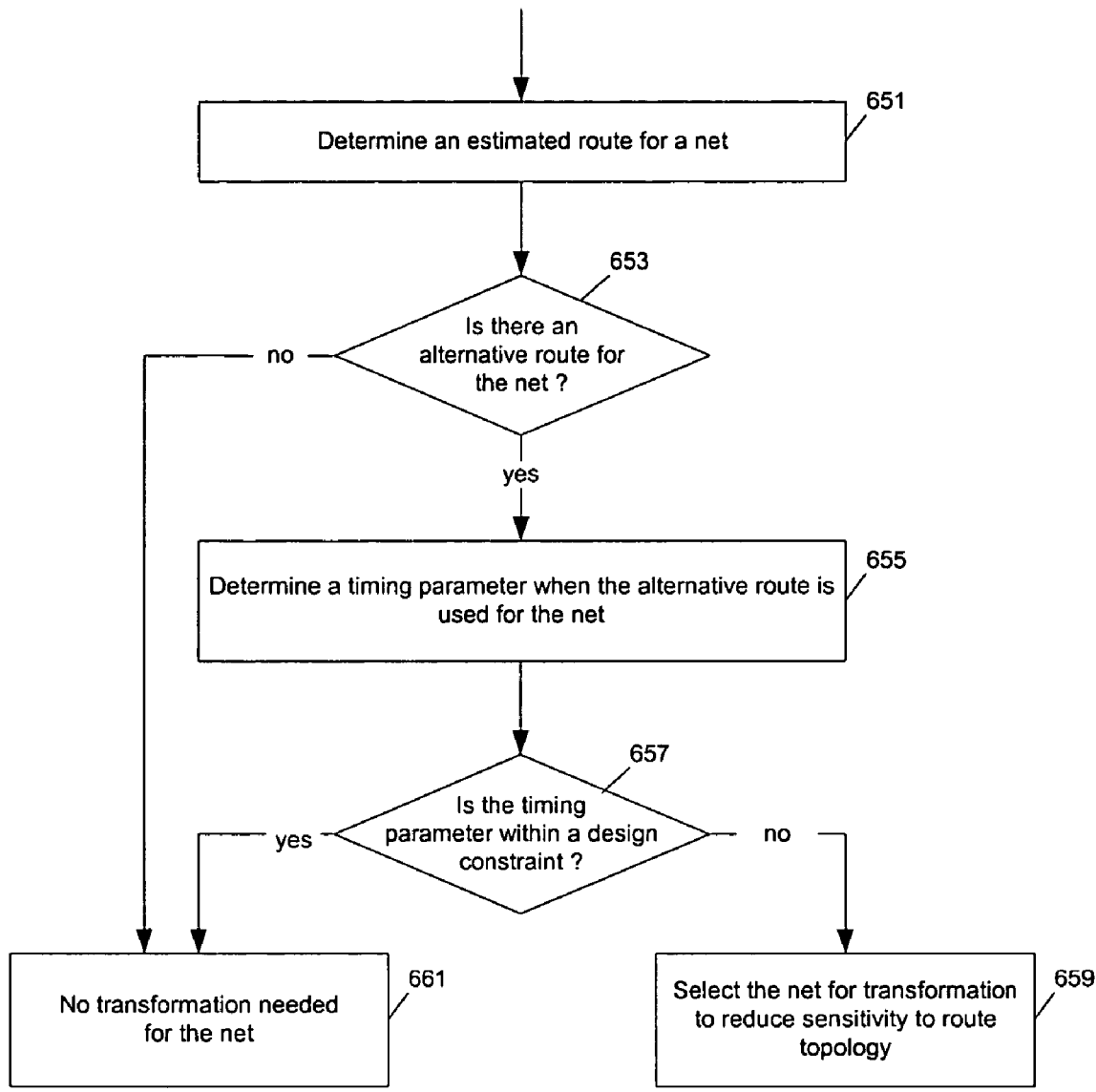
FIG. 15 illustrates a method to select nets for optimization according to one embodiment of the present invention.

FIG. 15 illustrates a method to select nets for optimization according to one embodiment of the present invention. Operation 651 determines an estimated route for a net. The estimated route may be determined using a global route estimator. Alternatively, the estimated route may be determined only from the positions of the drive and load elements of the net. For example, the distance between elements may be estimated as the Manhattan distance between the load element and the drive element. The estimated route is used to determine if the timing requirements are satisfied. For example, the estimated route can be used to determine the slack of an element, the worst negative slack on a path, and other timing parameters. If a timing requirement is not satisfied, the design of the circuit is modified. Typically, the reduction of route topology sensitivity is performed only after an acceptable solution is obtained, although the reduction of route topology sensitivity may also be performed during the synthesis process. If operation 653 determines that there is an alternative route for the net, operation 655 determines a timing parameter when the alternative route is used for the net. The alternative route may be determined through routing using different strategy, which may be time consuming. In one embodiment of the present invention, whether or not an alternative route exists for the net is determined from a number of criteria, which can be checked very efficiently. Examples of these criteria include the number of fanout of the net and the shape of the net. If operation 657 determines that the timing parameter is within a design constraint (or operation 653 determines that there is no alternative route for the net), there is no transformation needed for the net (661); this net does not need a transformation for the reduction of sensitivity to route topology. If operation 657 determines that the timing parameter is not within a design constraint, operation 659 selects the net for transformation to reduce sensitivity to route topology.

Figure 16:
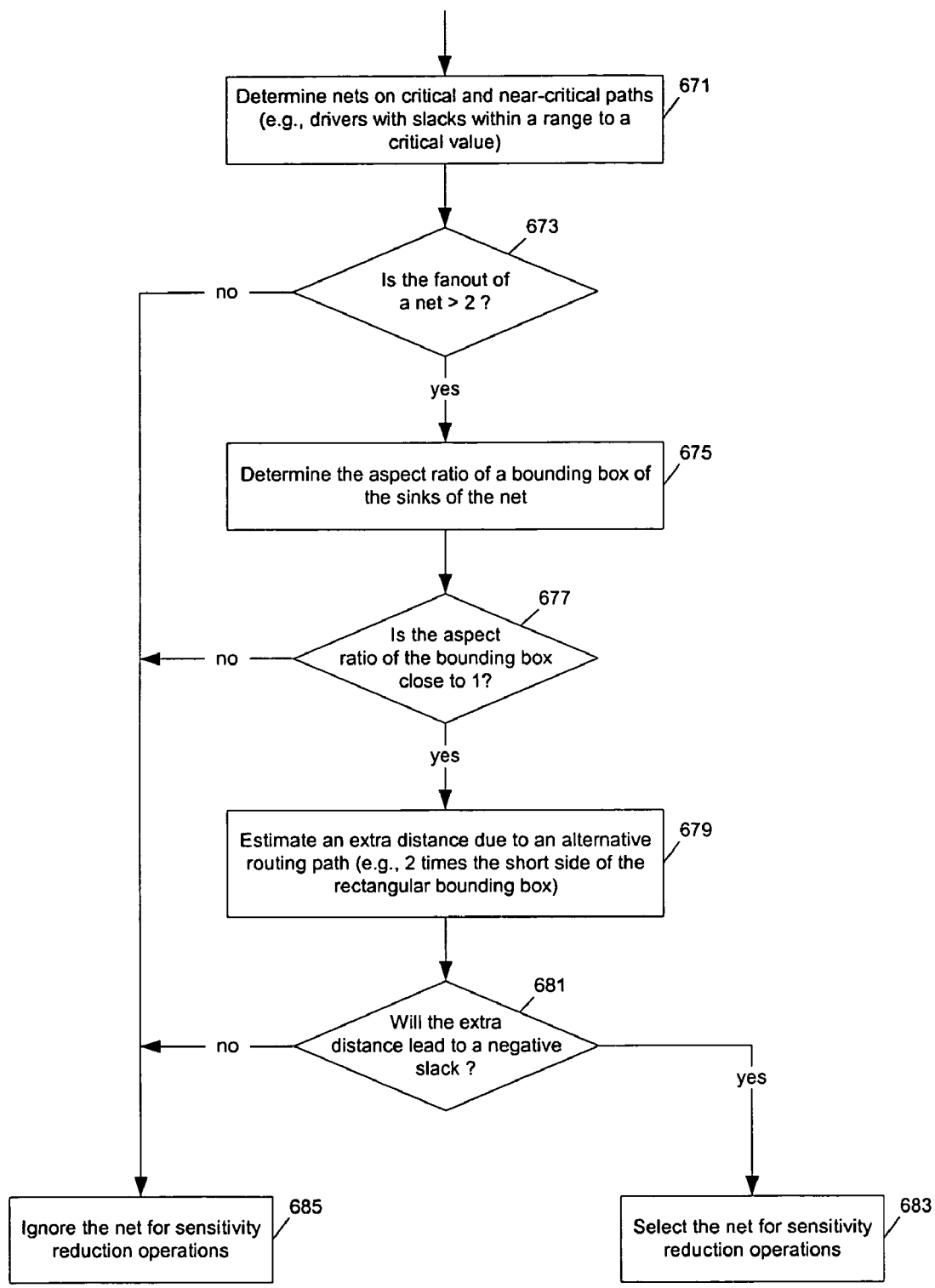
FIG. 16 illustrates a detailed method to select nets for optimization according to one embodiment of the present invention.

FIG. 16 illustrates a detailed method to select nets for optimization according to one embodiment of the present invention. Operation 671 determines nets on critical and near-critical paths (e.g., drivers with slacks within a range to a critical value). If operation 673 determines that the fanout of a net on a critical or near-critical path is less than or equal to two, the net is ignored for sensitivity reduction operations (685); otherwise, operation 675 determines the aspect ratio of a bounding box of the sinks of the net. If operation 677 determines that the aspect ratio of the bounding box is not close to one (e.g., smaller than a threshold value, such as 0.5 or a number determined from statistical data), the net is ignored for sensitivity reduction operations (685); otherwise, operation 679 estimates an extra distance due to an alternative routing path (e.g., 2 times the short side of the rectangular bounding box). If operation 681 determines that the extra distance will not lead to a negative slack (or violation of other timing requirements), the net is ignored for sensitivity reduction operations (685); otherwise, operation 683 selects the net for sensitivity reduction operations. Note that it is not necessary to use all the selection criteria illustrated in FIG. 16. For example, operation 677 may not be used in one embodiment. Further, other selection criteria may also be used with some or all of the selection criteria illustrated in FIG. 16. For example, after a set of nets are selected as candidates for transformation, the set of nets can be prioritized according to flow, or through the selection of a min-cut on a graph in a fashion similar to the prioritizing of sensitive instances for sizing.

Figure 17:
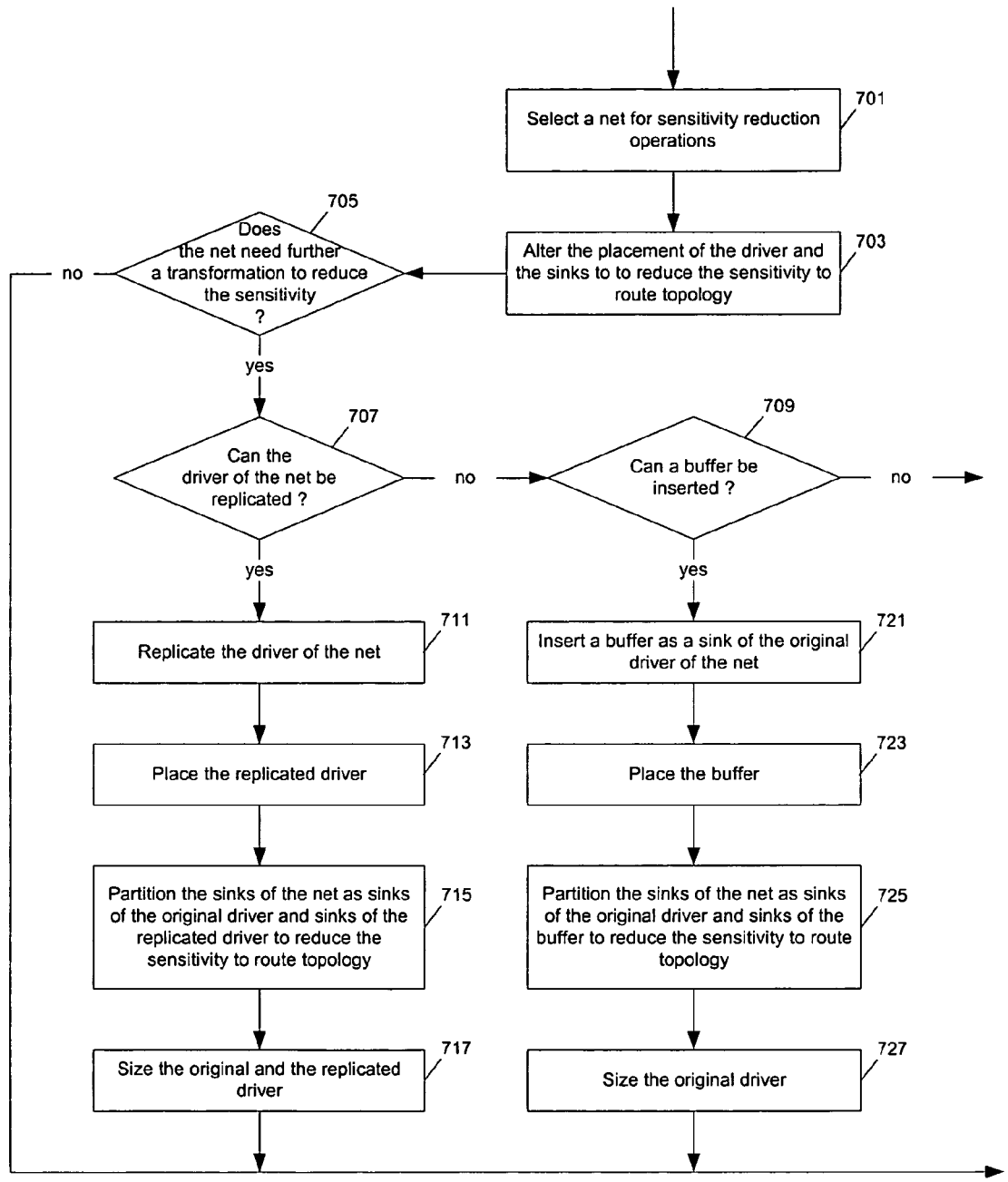
FIG. 17 illustrates a detailed method to transform a circuit design for route topology sensitivity reduction according to one embodiment of the present invention.

FIG. 17 illustrates a detailed method to transform a circuit design for route topology sensitivity reduction according to one embodiment of the present invention. After operation 701 selects a net for sensitivity reduction operations, operation 703 alters the placement of the driver and the sinks to reduce the sensitivity to route topology. For example, the placement may be altered to reduce the aspect ratio of the bounding box of the sinks of the net. If operation 705 determines that the net needs a further transformation to reduce the sensitivity (e.g., when the aspect ratio of the bounding box of the sinks of the net cannot be sufficiently reduced through altering the placement), operation 707 determines whether or not the driver of the net can be replicated. When the design constraints allow the replication of the driver, operation 711 replicates the driver of the net; operation 713 places the replicated driver; operation 715 partitions the sinks of the net as sinks of the original driver and sinks of the replicated driver to reduce the sensitivity to route topology; and operation 717 sizes the original and the replicated driver (e.g., to minimize the cost). However, if the driver of the net cannot be replicated (e.g., the driver of the net is an I/O port or a macro, or there is no appropriate location for the placement of the replicated driver), the operation 709 determines whether a buffer can be inserted between the driver and a sink of the net (e.g., whether or not there is an appropriate location between the driver and the sinks of the net for the placement of the buffer). After operation 721 inserts a buffer as a sink of the original driver of the net, operation 723 places the buffer; operation 725 partitions the sinks of the net as sinks of the original driver and sinks of the buffer to reduce the sensitivity to route topology; and operation 727 sizes the original driver (e.g., to reduce area cost). In one embodiment of the present invention, the insertion of the buffer is accepted only if the modification does not degrade the circuit. For example, the insertion of the buffer is accepted only if the worst negative slack on the path is not worsened, where the estimated routing path is used without considering the extra distance due to the alternative route topology. Thus, the reduction of the sensitivity to route topology is performed without degrading the design of the circuit. When the replication of driver and the insertion of a buffer are not allowable, other transformations may be further tried. For example, when the driver already has a replicated instance, the sinks may be repartitioned to reduce the sensitivity.

At least some of the above examples involve design constraints related to a timing parameter (e.g., worst negative slack of the circuit, a slack for an instance of a logic element in the design of the circuit, a delay on a path in the design of the circuit, a total negative slack of the circuit, or others). However, it is understood that the design constraints can be other types of constraints. For example, the constraints can be on the maximum capacitance, or the maximum length of wire between a driver element and a load element, or a set of different types of design rules and constraints. The design constraints can be on geometric parameters, timing parameters, impedance parameters and/or other parameters. According to at least some embodiments of the present invention, the impact of changes to these constraints are estimated as a variation of route topology; and transformations are performed to reduce the possibility that a variation of route topology in a subsequent implementation may cause the violation of these constraints.

In some of the above examples, the uncertainty at an earlier stage design (e.g., synthesis transformation) is due to the changes in parameters associated with the design constraint when different implementations of the circuit design are carried out in a later stage design (e.g., routing). However, it is understood that the uncertainty may also come from the possible error in estimating the parameters associated with the design constraint in certain design configurations. For example, the accuracy of the estimation of certain parameters can be poor for certain routing topologies. Thus, in one embodiment, the error bound of the solutions for these parameters are associated with the routing topologies to determine the likelihood of the design constraint being violated. Alternatively, routing topologies that degrade the accuracy of estimation can also be identified so that a synthesis transformation can be performed to avoid these configurations and reduce the possibility of having an invalid design after routing.

For example, some net topologies are difficult to model with the faster, simpler net-delay models used during synthesis. The Elmore delay model is an example of a fast net-delay model. Net models that are easy to calculate lose accuracy in some situations. The type of nets in these situations can be considered as more susceptible to route topology changes. Transformations (e.g., replication) can be used to modify the possible net topologies to reduce the inaccuracy of the simple delay model.

For example, when a circuit design has some loads on a net that are close to the driver and the others that are farther off, the path delay prediction could be inaccurate on loads that are farther off or located in different directions relative to the driver, especially if there is significant transition degradation to that load. In addition, the route topology effects can further add to an inaccurate delay prediction. In such a configuration, the Elmore delay model would not be accurate; and the design would be more sensitive to different route topologies. Thus, when a simple delay model (e.g., Elmore delay model) is used during synthesis, the likelihood of design constraint violation can be high. In one embodiment of the present invention, the driver of such a net is replicated so that the near loads are driven by one driver and the far loads are driven by another driver. Similarly, one embodiment of the present invention tries to avoid having loads located in different directions relative to the same driver (e.g., through replicating drivers). Replicating the driver putting it closer to some of the sinks would improve the accuracy of the delay estimation, and would reduce the chances of a different route topology used in the backend causing a violation of design constraints. Such a synthesis transformation improves the accuracy in the estimation of the delay and reduces the likelihood of getting an invalid design in a later stage implementation.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to design a circuit, the method comprising: determining a determined probability of a design constraint to be violated during a subsequent routing implementation of a design of the circuit; and modifying the design of the circuit based on the probability to reduce likelihood of the design constraint being violated during the subsequent routing implementation of the design.

2. The method of claim 1, wherein the likelihood of the design constraint being violated during a subsequent routing implementation of the design is due to uncertainty in estimating route topology.

3. The method of claim 1, wherein the likelihood of the design constraint being violated during a subsequent routing implementation of the design is due to uncertainty in estimating a parameter for a route topology.

4. The method of claim 3, further comprising: determining whether or not a route topology in the design of the circuit causes reduced accuracy in determining the parameter associated with the design constraint.

5. The method of claim 1, wherein whether or not the design constraint is likely to be violated during a subsequent routing implementation of the design is determined based at least on a bounding box enclosing load elements of a drive element.

6. The method of claim 5, wherein whether or not the design constraint is likely to be violated during a subsequent routing implementation of the design is determined further based on a number of fanout of a net on a timing critical or near-critical path; wherein the net connects the drive element to the load elements.

7. The method of claim 1, wherein said modifying comprises: replicating a first drive element to insert a second drive element; and reconnecting a portion of load elements of the first drive element as load elements of the second drive element.

8. The method of claim 1, wherein said modifying comprises: inserting a buffer element as a load element of a first drive element; and reconnecting a portion of load elements of the first drive element as load elements of the buffer element.

9. The method of claim 1, wherein said modifying comprises: rearranging placement of load elements of a drive element to reduce a ratio of a short side over a long side of a bounding box of the drive element and the load elements.

10. The method of claim 1, wherein said modifying comprises: transforming a portion of load elements of a first element as load elements of a second element.

11. The method of claim 1, wherein the design constraint comprises a timing constraint.

12. The method of claim 11, wherein the timing constraint comprises one of: a) worst negative slack of the circuit; b) a slack for an instance of a logic element in the design of the circuit; c) a delay on a path in the design of the circuit; and d) a total negative slack of the circuit.

13. The method of claim 1, wherein the design constraint comprises a design rule.

14. The method of claim 13, wherein the design rule comprises one of: a) maximum capacitance; and b) maximum length of wire between a driver element and a load element.

15. The method of claim 1, wherein said modifying comprises: determining a number of net candidates each of which may cause a violation in the design constraint when alternative route topology is used; and selectively modifying the design for a subset of the number of net candidates.

16. The method of claim 15, wherein said selectively modifying comprises: selecting one from the number of net candidates according to a flow, the flow representing a weighted count of a number of paths passing through a net candidate.

17. The method of claim 16, wherein the number of paths are one of: all paths passing through the net candidate; negative slack paths passing through the net candidate; congested paths passing through the net candidate; and paths with sensitive nets passing through the net candidate.

18. The method of claim 15, wherein said selectively modifying comprises: performing a min-cut on a graph with the number of net candidates to determine the subset for modification.

19. A machine implemented method to design a circuit, the method comprising: estimating a first distance between a drive element and a load element of the drive element according to a design of the circuit; verifying whether or not a timing constraint is satisfied using the first distance; estimating a second distance between the drive element and the load element according to the design of the circuit, the second distance being longer than the first distance; and determining whether or not a timing constraint is satisfied using the second distance, wherein the second distance is estimated only when a net connecting the drive element and the load element is selected for reduction of route topology sensitivity.

20. The method of claim 19, wherein the first distance is according to a first route topology; and the second distance is according to a second route topology.

21. The method of claim 19, further comprising: in response to a determination that a timing constraint is not satisfied when the second distance is used, determining whether or not a transformation can be performed on the design of the circuit to reduce the second distance without worsening a design cost function.

22. The method of claim 21, wherein the transformation comprises at least one of: replicating the drive element; sizing up the drive element; inserting a buffer element between the drive element and the load element; and adjusting placement of at least one element of: the drive element and load elements of the drive element.

23. The method of claim 19, wherein the net is selected only when the net is on a timing critical or near-critical path and a number of fanout of the net is larger than two.

24. The method of claim 23, wherein the net is further selected according to an aspect ratio of a bounding box enclosing load elements of the drive element.

25. A machine implemented method to estimate a path delay, the method comprising: determining a shape of a region of: a drive element, and a plurality of load elements of the drive element; and estimating a distance between the drive element and a first one of the plurality of load elements based at least on the shape of the region.

26. The method of claim 25, wherein said determining the shape of the region comprises: determining a bounding box enclosing the plurality of load elements; wherein the distance is estimated based at least on the bounding box.

27. The method of claim 26, wherein said estimating comprises: determining a Manhattan distance between the drive element and the first one of the plurality of load elements; wherein the distance is estimated as a function of the Manhattan distance and a length of a short side of the bounding box.

28. The method of claim 27, wherein the bounding box is rectangular.

29. A machine readable medium containing executable computer program instructions when executed by a data processing system, cause said data processing system to perform a method to design a circuit, the method comprising: determining a probability of a design constraint is likely to be violated during a subsequent routing implementation of a design of the circuit; and modifying the design of the circuit based on the determined probability to reduce likelihood of the design constraint being violated during a subsequent routing implementation of the design.

30. The medium of claim 29, wherein the likelihood of the design constraint being violated in a subsequent routing implementation of the design is due to uncertainty in estimating route topology.

31. The medium of claim 29, wherein whether or not the design constraint is likely to be violated during a subsequent routing implementation of the design is determined based at least on a bounding box enclosing load elements of a drive element.

32. The medium of claim 31, wherein whether or not the design constraint is likely to be violated during a subsequent routing implementation of the design is determined further based on a number of fanout of a net on a timing critical or near-critical path; wherein the net connects the drive element to the load elements.

33. The medium of claim 29, wherein said modifying comprises: replicating a first drive element to insert a second drive element; and reconnecting a portion of load elements of the first drive element as load elements of the second drive element.

34. The medium of claim 29, wherein said modifying comprises: inserting a buffer element as a load element of a first drive element; and reconnecting a portion of load elements of the first drive element as load elements of the buffer element.

35. The medium of claim 29, wherein said modifying comprises: rearranging placement of load elements of a drive element to reduce a ratio of a short side over a long side of a bounding box of the drive element and the load elements.

36. The medium of claim 29, wherein said modifying comprises: transforming a portion of load elements of a first element as load elements of a second element.

37. The medium of claim 29, wherein the design constraint comprises a timing constraint.

38. The medium of claim 37, wherein the timing constraint comprises one of: a) worst negative slack of the circuit; b) a slack for an instance of a logic element in the design of the circuit; c) a delay on a path in the design of the circuit; and d) a total negative slack of the circuit.

39. The medium of claim 29, wherein said modifying comprises: determining a number of net candidates each of which may cause a violation in the design constraint when alternative route topology is used; and selectively modifying the design for a subset of the number of net candidates.

40. The medium of claim 39, wherein said selectively modifying comprises: selecting one from the number of net candidates according to flow, the flow representing a weighted count of a number of paths passing through a net candidate.

41. The medium of claim 40, wherein the number of paths are one of: all paths passing through the net candidate; negative slack paths passing through the net candidate; congested paths passing through the net candidate; and paths with sensitive nets passing through the net candidate.

42. The medium of claim 39, wherein said selectively modifying comprises: performing a min-cut on a graph with the number of net candidates to determine the subset for modification.

43. A machine readable medium containing executable computer program instructions when executed by a data processing system, cause said data processing system to perform a method to design a circuit, the method comprising: estimating a first distance between a drive element and a load element of the drive element according to a design of the circuit; verifying whether or not a timing constraint is satisfied using the first distance; estimating a second distance between the drive element and the load element according to the design of the circuit, the second distance being longer than the first distance; and determining whether or not the timing constraint is satisfied using the second distance wherein the second distance is estimated only when a net connecting the drive element and the load element is selected for reduction of route topology sensitivity.

44. The medium of claim 43, wherein the first distance is according to a first route topology; and the second distance is according to a second route topology.

45. The medium of claim 43, wherein the method further comprises: in response to a determination that the timing constraint is not satisfied when the second distance is used, determining whether or not a transformation can be performed on the design of the circuit to reduce the second distance without worsening a design cost function.

46. The medium of claim 45, wherein the transformation comprises at least one of: replicating the drive element; sizing up the drive element; inserting a buffer element between the drive element and the load element; and adjusting placement of at least one element of: the drive element and load elements of the drive element.

47. The medium of claim 43, wherein the net is selected only when the net is on a timing critical or near-critical path and a number of fanout of the net is larger than two.

48. The medium of claim 47, wherein the net is further selected according to an aspect ratio of a bounding box enclosing load elements of the drive element.

49. A machine readable medium containing executable computer program instructions when executed by a data processing system, cause said data processing system to perform a method to estimate a path delay, the method comprising: determining a shape of a region of: a drive element, and a plurality of load elements of the drive element; and estimating a distance between the drive element and a first one of the plurality of load elements based at least on the shape of the region.

50. The medium of claim 49, wherein said determining a shape of a region comprises: determining a bounding box enclosing the plurality of load elements; wherein the distance is estimated based at least on the bounding box.

51. The medium of claim 50, wherein said estimating comprises: determining a Manhattan distance between the drive element and the first one of the plurality of load elements; wherein the distance is estimated as a function of the Manhattan distance and a length of a short side of the bounding box.

52. The medium of claim 51, wherein the bounding box is rectangular.

53. A data processing system to design a circuit, the data processing system comprising: means for determining a probability of a design constraint to be violated during a subsequent routing implementation of a design of the circuit; and means for modifying the design of the circuit based on the determined probability to reduce likelihood of the design constraint being violated during the subsequent routing implementation of the design.

54. The data processing system of claim 53, wherein the likelihood of the design constraint being violated during a subsequent routing implementation of the design is due to uncertainty in estimating route topology.

55. The data processing system of claim 53, wherein whether or not the design constraint is likely to be violated during a subsequent routing implementation of the design is determined based at least on a bounding box enclosing load elements of a drive element.

56. The data processing system of claim 55, wherein whether or not the design constraint is likely to be violated during a subsequent routing implementation of the design is determined further based on a number of fanout of a net on a timing critical or near-critical path; wherein the net connects the drive element to the load elements.

57. The data processing system of claim 53, wherein said means for modifying comprises: means for replicating a first drive element to insert a second drive element; and means for reconnecting a portion of load elements of the first drive element as load elements of the second drive element.

58. The data processing system of claim 53, wherein said means for modifying comprises: means for inserting a buffer element as a load element of a first drive element; and means for reconnecting a portion of load elements of the first drive element as load elements of the buffer element.

59. The data processing system of claim 53, wherein said means for modifying comprises: means for rearranging placement of load elements of a drive element to reduce a ratio of a short side over a long side of a bounding box of the drive element and the load elements.

60. The data processing system of claim 53, wherein said means for modifying comprises: means for transforming a portion of load elements of a first element as load elements of a second element.

61. The data processing system of claim 53, wherein the design constraint comprises a timing constraint.

62. The data processing system of claim 61, wherein the timing constraint comprises one of: a) worst negative slack of the circuit; b) a slack for an instance of a logic element in the design of the circuit; c) a delay on a path in the design of the circuit; and d) a total negative slack of the circuit.

63. The data processing system of claim 53, wherein said means for modifying comprises: means for determining a number of net candidates each of which may cause a violation in the design constraint when alternative route topology is used; and means for selectively modifying the design for a subset of the number of net candidates.

64. The data processing system of claim 63, wherein said means for selectively modifying comprises: means for selecting one from the number of net candidates according to flow, the flow representing a weighted count of a number of paths passing through a net candidate.

65. The data processing system of claim 64, wherein the number of paths are one of: all paths passing through the net candidate; negative slack paths passing through the net candidate; congested paths passing through the net candidate; and paths with sensitive nets passing through the net candidate.

66. The data processing system of claim 63, wherein said means for selectively modifying comprises: means for performing a min-cut on a graph with the number of net candidates to determine the subset for modification.

67. A data processing system to design a circuit, the data processing system comprising: means for estimating a first distance between a drive element and a load element of the drive element according to a design of the circuit; means for verifying whether or not a timing constraint is satisfied using the first distance; means for estimating a second distance between the drive element and the load element according to the design of the circuit, the second distance being longer than the first distance; and means for determining whether or not a timing constraint is satisfied using the second distance, wherein the second distance is estimated only when a net connecting the drive element and the load element is selected for reduction of route topology sensitivity.

68. The data processing system of claim 67, wherein the first distance is according to a first route topology; and the second distance is according to a second route topology.

69. The data processing system of claim 67, further comprising: means for, in response to a determination that a timing constraint is not satisfied when the second distance is used, determining whether or not a transformation can be performed on the design of the circuit to reduce the second distance without worsening a design cost function.

70. The data processing system of claim 69, wherein the transformation comprises at least one of: replicating the drive element; sizing up the drive element; inserting a buffer element between the drive element and the load element; and adjusting placement of at least one element of: the drive element and load elements of the drive element.

71. The data processing system of claim 67, wherein the net is selected only when the net is on a timing critical or near-critical path and a number of fanout of the net is larger than two.

72. The data processing system of claim 71, wherein the net is further selected according to an aspect ratio of a bounding box enclosing load elements of the drive element.

73. A data processing system to estimate a path delay, the data processing system comprising: means for determining a shape of a region of: a drive element, and a plurality of load elements of the drive element; and means for estimating a distance between the drive element and a first one of the plurality of load elements based at least on the shape of the region.

74. The data processing system of claim 73, wherein said means for determining a shape of a region comprises: means for determining a bounding box enclosing the plurality of load elements; wherein the distance is estimated based at least on the bounding box.

75. The data processing system of claim 74, wherein said means for estimating comprises: means for determining a Manhattan distance between the drive element and the first one of the plurality of load elements; wherein the distance is estimated as a function of the Manhattan distance and a length of a short side of the bounding box.

76. The data processing system of claim 75, wherein the bounding box is rectangular.

* * * * *